(12) United States Patent
Sandholm et al.

(10) Patent No.: US 7,640,189 B2
(45) Date of Patent: *Dec. 29, 2009

(54) COMBINATORIAL AUCTION BRANCH ON BID SEARCHING METHOD AND APPARATUS

(75) Inventors: Tuomas Sandholm, Pittsburgh, PA (US); Subhash Suri, Santa Barbara, CA (US); David L. Levine, Chesterfield, MO (US); Andrew G. Gilpin, Pittsburgh, PA (US)

(73) Assignee: CombineNet, Inc., Pittsburgh, PA (US)

( * ) Notice: Subject to any disclaimer, the term of this patent is extended or adjusted under 35 U.S.C. 154(b) by 1518 days.

This patent is subject to a terminal disclaimer.

(21) Appl. No.: 10/411,879

(22) Filed: Apr. 10, 2003

(65) Prior Publication Data

US 2003/0225677 A1    Dec. 4, 2003

Related U.S. Application Data

(63) Continuation-in-part of application No. 09/789,480, filed on Feb. 20, 2001, now Pat. No. 7,305,363.

(60) Provisional application No. 60/371,450, filed on Apr. 10, 2002, provisional application No. 60/183,674, filed on Feb. 18, 2000.

(51) Int. Cl.
*G06F 15/32* (2006.01)

(52) U.S. Cl. .................... 705/26; 705/35; 705/37

(58) Field of Classification Search ............ 705/35–37, 705/26–35 RW
See application file for complete search history.

(56) References Cited

U.S. PATENT DOCUMENTS 6,704,716 B1    3/2004    Force
6,718,312 B1    4/2004    McAfee et al.

OTHER PUBLICATIONS

Sandholm, An Algorithm for Optimal Winner Determination in Combinatorial Auctions, published Jan. 28, 1999.*
Michael H. Rothkopf, Aleksandar Pekeč and Ronald M. Harstad, "Computationally Manageable Combinatorial Auctions", Management Science, 44(8), 21 pp. (1998).
Curt Powley and Richard E. Korf, "Single-Agent Parallel Window Search", IEEE Transactions On Pattern Analysis And Machine Intelligence, vol. 13, No. 5, pp. 466-477, (May 1991).
Yuzo Fujishima, Kevin Leyton-Brown and Yoav Shoham, "Taming the Computational Complexity of Combinatorial Auctions: Optimal And Approximate Approaches", In Proceedings of the Sixteenth International Joint Conference on Artificial Intelligence (IJCAI), 6 pp., (1999).

(Continued)

*Primary Examiner*—Richard Weisberger
(74) *Attorney, Agent, or Firm*—The Webb Law Firm

(57) ABSTRACT

In a multi-unit combinatorial auction, reverse auction, or exchange, a number of bids can be received, with each bid including one or more items and for each item a desired quantity thereof. Each bid also includes a price. A number of unique combinations of bids can be formed from the received bids, and the one combination of bids which represents the best value in terms of an auction setting, a reverse auction setting and/or an exchange setting can be determined. Thereafter, the bids forming this combination can be declared the winning bids of the auction, reverse auction or exchange.

28 Claims, 14 Drawing Sheets

OTHER PUBLICATIONS

Holger H. Hoos and Craig Boutilier, "Solving Combinatorial Auctions Using Stochastic Local Search", American Association for Artificial Intelligence, 8 pp., (2000).

Kevin Leyton-Brown, Mark Pearson and Yoav Shoham, "Towards A Universal Test Suite For Combinatorial Auction Algorithms", Electronic Commerce (EC'00), 11 pp., (2000).

Tuomas Sandholm and Subhash Suri "Improved Algorithms For Optimal Winner Determination In Combinatorial Auctions And Generalizations", In the Proceedings of the National Conference on Artificial Intelligence (AAAI), 8 pp., (2000).

Tuomas W. Sandholm, "An Algorithm For Optimal Winner Determination In Combinatorial Auctions", In the Proceedings of the Sixteenth International Joint Conference on Artificial Intelligence (IJCAI), 6 pp., (1999).

Alexander Reinefeld and T. Anthony Marsland, "Enhanced Iterative-Deepening Search", IEEE Transactions On Pattern Analysis And Machine Intelligence, vol. 16, No. 7, pp. 701-710, (Jul. 1994).

Daniel Lehmann, Liadan Ita O'Callaghan and Yoav Shoham, "Truth Revelation In Rapid, Approximately Efficient Combinatorial Auctions", In the Proceedings of the ACM Conference on Electronic Commerce (ACM-EC), 17 pp., (1999).

Noam Nisan, "Bidding And Allocation In Combinatorial Auctions", Institute of Computer Science, Hebrew U., Jerusalem, 25 pp., (2000).

S.J. Rassenti, V.L. Smith and R.L. Bulfin, "A Combinatorial Auction Mechanism For Airport Time Slot Allocation", The Bell Journal of Economics, 13(2): pp. 402-417, (1982).

Tuomas W. Sandholm, "An Implementation Of The Contact Net Protocol Based On Marginal Cost Calculations", In the Proceedings of the National Conference on Artificial Intelligence (AAAI), 7 pp., (1993).

Tuomas W. Sandholm, "eMediator: A Next Generation Electronic Commerce Server", In AAAI-99 Workshop on AI in Electronic Commerce, pp. 341-348, (1996).

Moshe Tennenholtz, "Some Tractable Combinatorial Auctions", American Association for Artificial Intelligence, 6 pp., (2000).

Carla P. Gomes, Bart Selman and Henry Kautz, "Boosting Combinatorial Search Through Randomization", American Association For Artificial Intelligence, In Proc. AAAI98, 7 pp., (1998).

Michael Luby, Alistair Sinclair and David Zuckerman, "Optimal Speedup Of Las Vegas Algorithms", Information Processing Letters, 47, 13 pp., (1993).

Arne Andersson, Mattias Tenhunen and Fredrik Ygge, "Integer Programming For Combinatorial Auction Winner Determination", In the Proceedings of the Fourth International Conference on Multi-Agent Systems (ICMAS), 8 pp., (2000).

N. Korte and R.H. Mohring, "An Incremental Linear-Time Algorithm For Recognizing Interval Graphs", SIAM Journal On Computing 18(1): pp. 68-81, (1989).

* cited by examiner

BID = {5 OF ITEM A, −10 OF ITEM B, PRICE = −P}

(B1 OR B2) XOR B3  ← 960

(B1 XOR B2) OR B3  ← 962

B1 OR (B2 XOR B3)  ← 964

B1 XOR (B2 OR B3)  ← 966

B1 OR B3  ← 968

B1 XOR B3  ← 970

(B1 OR B2) XOR (B3 OR B4)  ← 972

(B1 XOR B2) OR (B3 XOR B4)  ← 973

(B1 OR B2) XOR (B3 XOR B4)  ← 974

(B1 XOR B2) XOR (B3 OR B4)  ← 976

(B1 XOR B2 XOR B4) OR (B3 XOR B5)  ← 978

(B1 OR B2 OR B4) XOR (B2 OR B3)  ← 980

FIG. 11

| BID | QTY ITEM A | QTY ITEM B | QTY ITEM C | BID PRICE |
|---|---|---|---|---|
| B1 | 5 | 10 | 15 | P1 |
| B2 | 10 | 0 | 4 | P2 |
| B3 | 1 | 1 | 0 | P3 |
| B4 | 0 | 50 | 0 | P4 |

| TOTAL QTY AVAILABLE | | |
|---|---|---|
| ITEM A | ITEM B | ITEM C |
| 10 | 50 | 15 |

B1 = (2, 4, 6)

B2 = (1, 2, 4, 5, 7)

B3 = (1, 3, 7, 8)

B4 = (1, 3, 5, 7)

COMBINATORIAL AUCTION BRANCH ON BID SEARCHING METHOD AND APPARATUS

CROSS REFERENCE TO RELATED APPLICATIONS

This application claims priority from U.S. Provisional Patent Application Ser. No. 60/371,450, filed Apr. 10, 2002, and is a continuation-in-part of U.S. patent application Ser. No. 09/789,480, filed Feb. 20, 2001 now U.S. Pat. No. 7,305,363, which claims priority from U.S. Provisional Patent Application Ser. No. 60/183,674, filed Feb. 18, 2000.

BACKGROUND OF THE INVENTION

1. Field of the Invention

This invention relates combinatorial auctions, reverse auctions and exchanges, and, more particularly, to determining which combination of bids in a combinatorial auction, reverse auction, or exchange has the most favorable exchange of value.

2. Description of Related

In sequential auctions, items are auctioned one at a time. If an agent has preferences over bundles (combinations of items), then bidding in such auctions is difficult. To determine one's valuation for an item, one needs to guess what items one will receive in later auctions. This requires speculation of what the others will bid in the future. This introduces uncertainty and computational cost, both of which reduce efficiency. Furthermore, in auctions with a reasonable number of items, the lookahead becomes intractable, and there is no easy way to bid rationally. Therefore, the future uncertainties of sequential auctions result in inefficiencies making it difficult for rational agents to bid.

An alternative to sequential auctioning of the interdependent items would be to open them all for auction in parallel. However, some of the same problems prevail. For example, when bidding for an item, the bidder does not know its valuation because it depends on which other items the bidder wins, which in turn depends on how others will bid (in sealed-bid auctions this is not known to the bidder, and in open-cry auctions it may become known only later). In parallel auctions, an additional difficulty arises: each bidder would like to wait until the end to see what the going prices will be. If each bidder plans to wait until the end, bidding will not commence. Therefore, parallel auctions also have future uncertainties that result in inefficiencies.

One solution to this problem is to allow bidders to place bids for combinations of individual items instead of only one individual item.

There are, however, situations involving the exchange of items for value in which there may exist synergies in the preferences for, not only, combinations of the items, but also for the quantity of each of the items. For example, an auctioneer holding items wishes to maximize the value obtained through the auction of the items. Bidders may have a willingness to exchange more value for combinations of items and/or selective quantities thereof than they would for individual elements and/or preset quantities thereof of the combination, if considered alone and aggregated. For example, if Q1, Q2, Q3, Q4 and Q5 are quantities, or units, of items A, B, C, D and E, respectively, and if a bidder wishes to acquire one-half of each of item A, item B, and item C, the bidder may have a greater willingness to acquire and pay for this combination then buying the whole of quantities Q1, Q2 and Q3 of items A, B and C. This may occur, for example, where the bidder has no use for the full quantity, or all the units, of a particular item, e.g., electricity markets, equities trading, FCC bandwidth auctions, transportation exchanges, pollution rights auctions, and auctions for airport landing slots. In addition, the bidder may have willingness to pay more than P1+P2+P3 for the full quantity Q1+Q2+Q3 of the three items A, B and C. This effect, which may be bidder-specific, may also be present in a reverse auction context where buyers are the auctioneers, for example, where portions of a construction contract are offered to be bid upon by construction contractors.

To the auctioneer, it is then desirable, to structure an auction to allow a bidder to bid for combinations of items and/or all or part of the quantities thereof, i.e., a multi-unit combinatorial auction, in order to gain the value of their synergies. Similarly, it is desirable for bidders to be able to bid on combinations of items and/or all or part of the quantities thereof. A bidder may be unwilling to bid more than the sum of his or her willingness to pay for all or part of the quantities available for each individual item and, thus, may have to forgo the opportunity to reap the synergistic gains. Alternatively, a bidder may be exposed to risk by overbidding in an eventually unsuccessful attempt to obtain a combination of items and/or all or part of the quantities available therefor.

Conventionally, practical implementations of the class of situations involving superadditive preferences, for example multi-unit combinatorial auctions, have proven difficult because of the complexity of considering numerous possible combinations of bids for items, especially where each bid includes one or more items and for each item a desired quantity thereof. (A special case of a multi-unit combinatorial auction, or exchange, occurs when each item thereof has only a quantity of one (1) associated therewith.) Given the complexity of the calculations, a computer or equivalent device is a virtual necessity to perform the task. Conventionally, computer-implemented methods of selecting winning bids in a multi-unit combinatorial auction involve representing the items, the quantities of each item and the price of each of a plurality of bids in a computer or equivalent and performing particular operations on this data to determine winning bids. However, conventional methods are impractical for many applications.

Winner determination in multi-unit combinatorial auctions means choosing which bids to accept that produce the most favorable exchange of value under the constraint that all or part of the available quantity of each item can be given out. However, presently, no effective means exist for testing all possible combination of bids received in a multi-unit combinatorial auction, reverse auction, or exchange, and for determining from each possible combination which combination of bids produces the most favorable exchange of value.

SUMMARY OF THE INVENTION

The invention is a computer-implemented method for determining winning bids in a combinatorial auction or exchange. The method includes receiving bids, wherein each bid includes one or more items and a bid price associated with said one or more items. One of the received bids is chosen and bids are selected from the received bids as a function of the chosen bid, wherein the selected bids include the chosen bid. From the selected bids, at least part of a search tree that defines for each selected bid at least one node on one level of the search tree that is connected to at least one node on another level of the search tree by an inclusion path or an exclusion path is formed. A plurality of unique paths of the search tree are searched to determine for each path a candidate allocation of the selected bids. Each candidate allocation includes a combination of the selected bids that lie along the corresponding search path and a price that is the sum of the bid prices of the combination of the selected bids. When a price of a candidate allocation is better than a current price of a best allocation, the best allocation and its price are updated with the candidate allocation and its price.

The step of searching a plurality of unique paths of the search tree includes determining an upper bound price of a first group of bids of a subtree of the search tree and determining a difference between (1) a sum of the prices of the bids that lie on a search path connected to the subtree and (2) the current price of the best allocation. If the upper bound price is less than or equal to said difference, each branch of the subtree is excluded from the search path. Otherwise, at least one branch of the subtree is included on the search path.

The determination of an upper bound includes forming a first linear program matrix for the first group of bids wherein each column of the first matrix represents one of the bids of the first group of bids, the intersection of each row and each column includes a variable and a quantity of the corresponding item in the corresponding bid, and the sum of the quantities in each row equals the total quantity of the corresponding item available in a forward auction, the total quantity of the corresponding item required in a reverse auction or zero (0) in an exchange. An objective is defined for the first matrix and each requirement that a solution of the first matrix cause at least one variable thereof to have an integer value is relaxed whereupon the at least one variable can have any numeric value. The first matrix is solved to achieve the objective thereby determining values for the variables. The upper bound price of the first group of bids is then determined as a function of the thus determined values of the variables of the first matrix.

The objective can be to maximize the cost of items sold in a forward auction, minimize the cost of items purchased in a reverse auction or maximize a difference between the cost of items sold and the cost of items purchased in an exchange.

The searching of a plurality of unique paths of the search tree can be terminated if the at least one variable that would have an integer value had each requirement not been relaxed has an integer value in response to solving the first matrix.

The method can also include identifying a second group of bids that is a subset of the first group of bids. A second linear program matrix can be formed for the second group of bids. Each column of the second matrix represents one of the bids of the second group of bids, the intersection of each row and each column includes a variable and a quantity of the corresponding item in the corresponding bid, and the sum of the quantities in each row equals the total quantity of the corresponding item available in a forward auction, the total quantity of the corresponding item required in a reverse auction or zero (0) in an exchange. Each requirement that a solution of the second matrix cause at least one variable thereof to have an integer value is relaxed whereupon the at least one variable can have any numeric value. The value of the variable at the intersection of each row and each column of the second matrix can be assigned the value determined for the variable at the intersection of the corresponding row and column of the first matrix. The upper bound price of the second group of bids can then be determined as a function of the substituted values of the variables in the second matrix.

The solution of the first matrix can progress until the upper bound price is greater than said difference.

When a first selected bid has an item in common with a second selected bid only one of the first and second selected bids is included in a candidate allocation. When no selected bid has an item in common with another selected bid, all of the selected bids can be included in a candidate allocation.

The step of choosing one of the received bids can include choosing the one received bid based on at least one of the following heuristics: the bid having the highest normalized bid price; the bid having a bid price with the highest surplus above the worth of the one or more items thereof; the bid having the highest number of at least one item in common with another bid; the bid having the largest number of items; the bid whose variable has the value closest to 1; and the bid whose variable has the value closest to 0.5. The at least one heuristic to be applied depends on at least one characteristic of the linear program matrix.

The characteristic includes: the number of columns in the first matrix; the number of rows in the first matrix; the number of nonzero coefficients in the first matrix; and/or the number of nonzero coefficients in the first matrix divided by the product of the number of columns and the number of rows in the first matrix.

The method can also include separating the selected bids into at least one group of disjoint bids and determining an upper bound for each group of bids.

For one group of bids, a value MIN can be determined that represents a minimum price the group of bids must exceed to find a candidate allocation that has a price better than the current price of the best allocation. If the upper bound for the group of bids is less than MIN for the group of bids, searching of the group of bids is terminated. Otherwise, a first subgroup of bids is defined from the group of bids. Next, one of the bids of the first subgroup of bids is chosen and, based on the chosen bid, bids are selected from the first subgroup of bids. The selected bids also include the chosen bid. From the thus selected bids at least part of another search tree is formed that defines for each such selected bid at least one node on one level that is connected to at least one node on another level by at least one of an inclusion branch and an exclusion branch. A plurality of unique paths of the other search tree are searched to determine for each path a candidate allocation of the selected bids. Each candidate allocation includes a combination of the selected bids that lie along the corresponding search path and a price that is the sum of the bid prices of the combination of the selected bids. Lastly, when a price of a thus determined candidate allocation is better than the current price of the best allocation, the best allocation and its price are updated with the candidate allocation and its price.

Any one or combination of the foregoing steps can be embodied in instructions stored on computer readable medium. When executed by a processor, the instructions cause the processor to perform any one or combination of the foregoing steps.

BRIEF DESCRIPTION OF THE DRAWINGS

FIG. 11 is a series of exemplary bids combined using "OR" and/or "XOR" constraints;

DETAILED DESCRIPTION OF THE INVENTION

Figure 1:
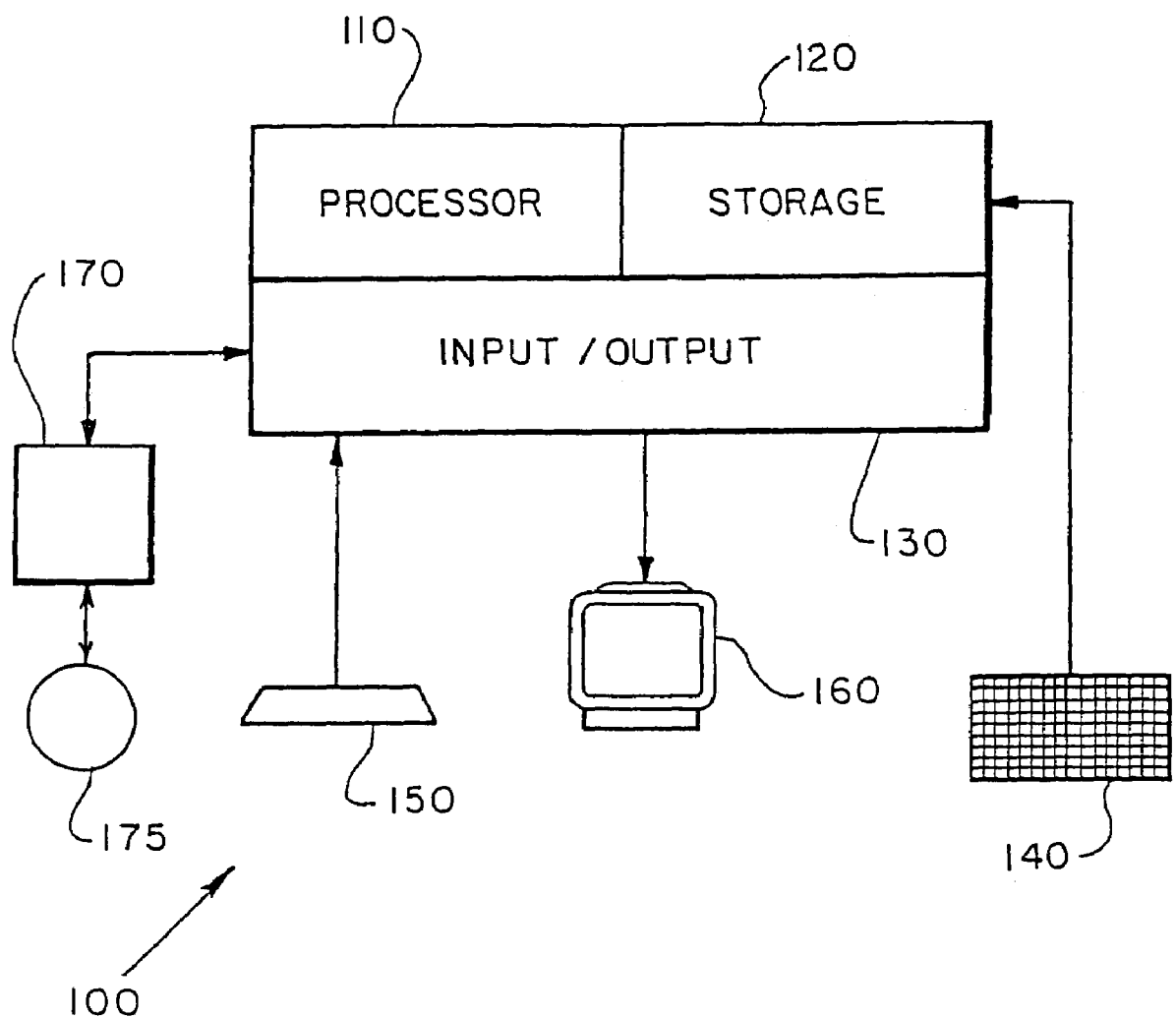
FIG. 1 depicts a computer system capable of being configured to embody aspects of the invention in accordance with an illustrative embodiment.

While this invention is susceptible of embodiment in many different forms, there is described herein in detail an illustrative embodiment with the understanding that the present disclosure is to be considered as an example of the principles of the invention and is not intended to limit the invention to the embodiment illustrated.

In general, however, the present invention may be applied to a class of computing problems computationally equivalent to the problem of optimal allocation determination in combinatorial auctions. For example, the present invention may be applied to the weighted set packing problem where a set is a combination of items and a weight is a bid price. Another equivalent problem is the coalition structure generation in characteristic function games problem. There items could be agents and coalitions combinations of agents. Bid prices would be values of coalitions; an allocation could be a coalition structure where it is desired to find the structure that maximized a sum of the values of the coalition. Still another equivalent problem (after removal of dominated bids as described below) is the weighted independent set problem. In the weighted independent set problem, a graph with vertices and edges, the vertices having associated weights, is identified and an independent set is a collection of vertices such that no two vertices are connected. Solution of the problem involves finding an independent set with the maximum sum of the weights associated with the vertices. Yet another application of the present invention is to the weighted maximum clique problem. As above a graph having weighted vertices is identified and solution of the problem involves finding a clique with the highest sum of the weights of member vertices. The weighted maximum clique problem may be reduced to the weighted independent set problem by taking the complement graph. The present invention may then be applied to solve the weighted independent set problem. One skilled in the art will recognize many problems that can be converted to the weighted independent set problem by appropriate reductions for solution with the present invention. More generally, the present invention may be applied to any NP-complete problem by converting it to a weighted set packing problem, and applying the present invention to the weighted set packing problem.

More particularly, the present invention provides a method and apparatus for determining the winners in combinatorial auctions. The present invention may be used to find the optimal solution to a combinatorial auction. If a method in accordance with the present invention is terminated before it has completed, it will still have a feasible solution in hand at any time, and this feasible solution improves monotonically, the more time that is allocated to the method.

An approach of the present invention for optimal winner determination is to allow all combinations to be bid on, and to capitalize on the space of bids being necessarily extremely sparsely populated in practice. For example, even if there are only 100 items to be auctioned, there are $(2^{100})-1$ combinations, and it would take an inordinate amount of time to bid on all of them. Sparseness of bids implies sparseness of the allocations that actually need to be checked. There is described herein a method that constructively checks each allocation that has nonzero value exactly once, and does not construct allocations that have zero value. Therefore, unlike dynamic programming, this method only generates those parts of the search space which are actually populated by bids.

FIG. 1 depicts a computer system 100 capable of embodying aspects of the invention. Shown are a microprocessor 110, a storage 120 and an input/output system 130. The storage 120 is capable of being configured to provide a data structure 140 which may contain data manipulated by the computer system 100 when embodying aspects of the invention. Further illustrated is a media drive 170, such as a disk drive, CD-ROM drive, or the like. The media drive 170 may operate with a computer-usable storage medium 175 capable of storing computer-readable program code able to configure the computer system 100 to embody aspects of the invention. The input/output system 130 may also operate with a keyboard 150 or a display 160. One skilled in the art will recognize numerous structures of programmed or programmable logic capable of being configured to embody aspects of the invention.

In the illustrative embodiment of the invention, computer program code configures a computer to embody aspects of the invention. So configured, representations of physical quantities and characteristics are manipulated through a series of operations to achieve a method, apparatus, and embodied data structures for optimal anytime winner determination in combinatorial auction-type problems. One skilled in the art will appreciate the distinction between the manipulation of physical quantities and representations thereof within a computer and will quickly apprehend when reference is being made to one or the other.

The computer system 100 may be a networked computer and in one embodiment, communicates with other computers over a network. In one embodiment the invention is used to conduct electronic commerce in a networked computing environment. In a more preferred embodiment, the networked computing environment is the Internet.

Figure 2:
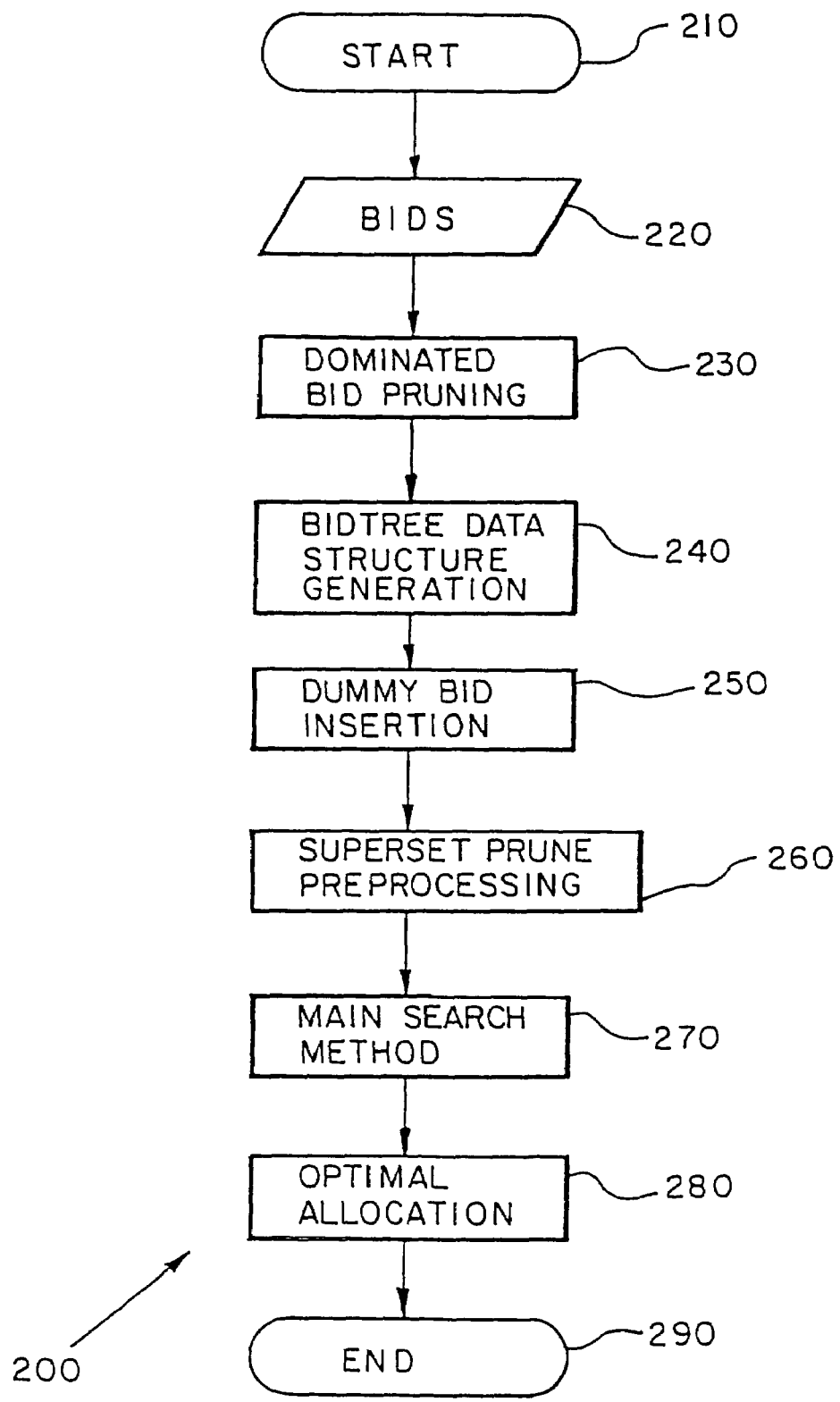
FIG. 2 depicts a method for optimal anytime winner determination in combinatorial auction-type problems in accordance with an illustrative embodiment.

An overview of the illustrative embodiment may be provided with reference to FIG. 2. Depicted there is a winner determination method 200. Processing initiates at a start terminal 210 and continues to a bids data block 220 where a plurality of bids are received. In the illustrated embodiment, a bid is a set of items with an associated price and identity of the bidder.

Next, a dominated bid pruning process 230 removes from further consideration dominated bids. A bid for a set of items is dominated when there exists another bid for the same set of items at a higher bid price. In other words, bids that are placed on a combination for which a higher bid has also been placed are deleted.

Then, a bidtree data structure generation 240 generates a bidtree data structure with the remaining bids from the bids data block 220 after pruning by the dominated bid pruning process 230. A dummy bid insertion process 250, then inserts into the bidtree data structure bids for all single items for which there are not already bids; these bids are given a price of $0.00. Additional aspects of the bidtree data structure are described with reference to FIG. 3A.

Next, a superset prune preprocessing process 260 examines the bids individually to determine whether there are combinations of disjoint subsets of the items in the bid, the sum of whose bid prices is greater than, or equal to, the bid. These bids are pruned from the bidtree data structure. This process is discussed in greater detail with reference to FIG. 7 and FIG. 8.

A main search method 270 then executes which determines the optimal allocation. The optimal allocation refers to which bids should be accepted by an auctioneer seeking to maximize revenue from an auction. These bids would be the winning bids in a combinatorial auction in accordance with an illustrative embodiment. The main search method 270 is described in greater detail with reference to FIG. 5. An optimal allocation data block 280 returns the optimal allocation and processing completes through an end terminal 290.

Greater detail of aspects of the illustrative embodiment outlined in FIG. 2 will now be provided.

Figure 3A:
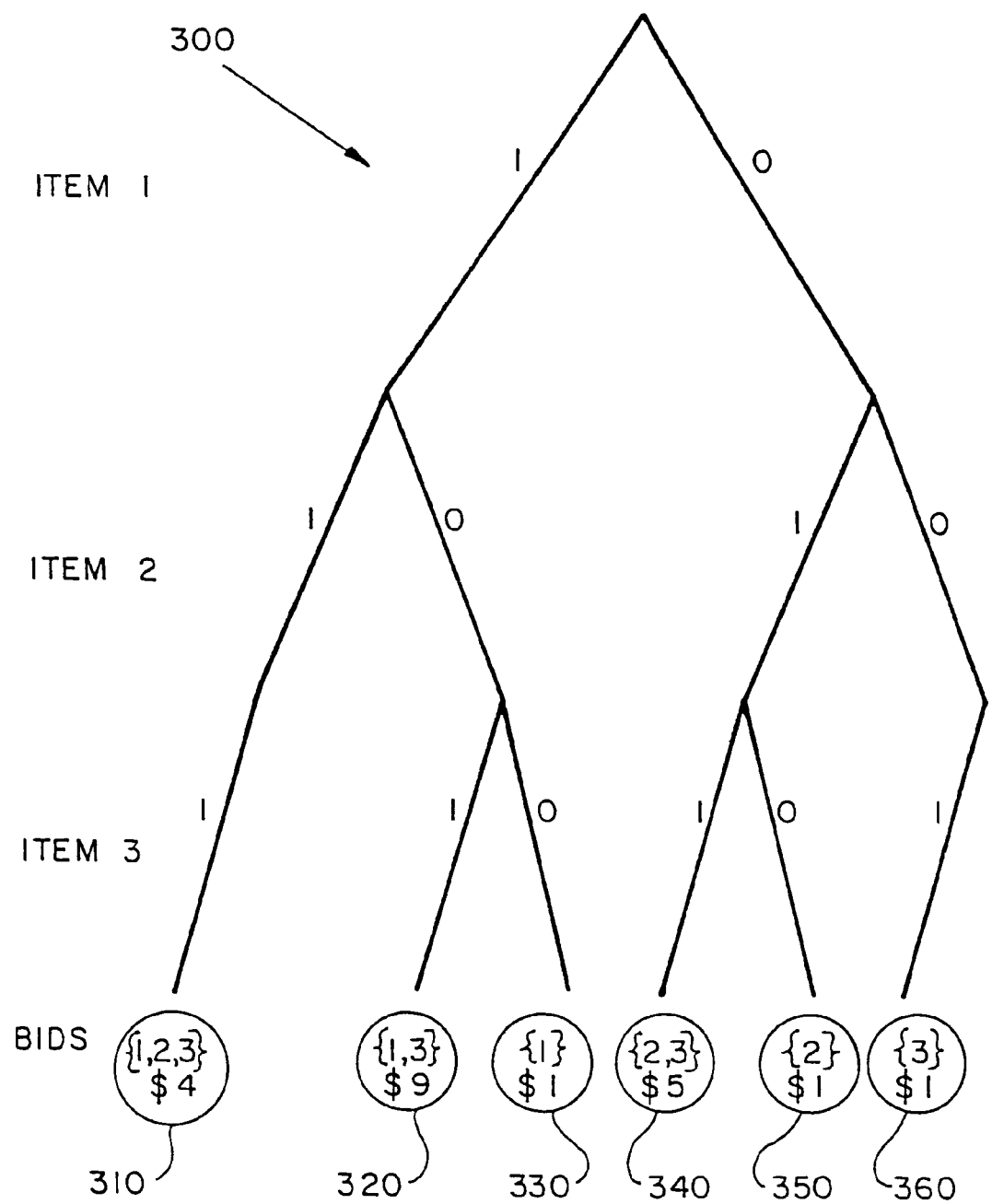
FIG. 3A depicts a bidtree data structure in accordance with an illustrative embodiment.

FIG. 3A illustrates a bidtree data structure 300 in accordance with an illustrative embodiment. The bidtree data structure 300 may be embodied in a computer readable medium, such as a memory, e.g., storage 120. As one of skill in the art recognizes, when a computer-readable medium, such as a memory, is configured to embody the bidtree data structure 300, structure is imposed on the computer-readable medium. The bidtree data structure 300 shown in FIG. 3A is one example of a Bidtree data structure; one skilled in the art will quickly realize the invention is not limited to the one illustrated. Further, while the illustrated embodiment uses the term "bids" and "bidtree" one skilled in the art will recognize these terms as exemplars of an application of the aspects of the invention to a combinatorial auction in accordance with the illustrated embodiment. From the disclosure herein, one of skill will understand how aspects of the invention including the bidtree data structure may be applied in other contexts of the same class as the combinatorial auction problem.

Now, in further detail, the bidtree data structure 300 is a data structure configured as a binary tree. There is one level in the bidtree data structure 300 for each item in an auction. In the illustrated embodiment, the items are numbered and the level of the tree corresponds to the number of the item. As can be seen, the first level of branching corresponds to item {1}, the second to item {2}, and the third to item {3}. More generally, the number of levels of the tree correspond to the number of items.

Bids, i.e., combinations of items and associated prices, are represented as leaves of the bidtree data structure 300. The inclusion of an item in a bid corresponds to a direction of branching at the level of the tree corresponding to that item. Shown in FIG. 3A are a first bid 310 consisting of items {1,2,3}, a second bid 320 consisting of items {1,3}, a third bid 330 consisting of item {1}, a fourth bid 340 consisting of items {2,3}, a fifth bid 350 consisting of item {2}, and an sixth bid 360 consisting of item {3}. As shown, the presence of an item in a bid corresponds to the left-branch at that level of the tree, and exclusion correspond to the right branch at that level of the tree. One of skill will appreciate the particular direction of branching is not fundamental to the present invention. Illustrated along the branches of the tree and ones (1s) and zeroes (0s). These represent inclusion and exclusion, respectively. Entry of a bid in the bidtree data structure 300 thus corresponds to following the inclusion branches at levels corresponding to items in the bid and the exclusion branches at levels corresponding to items not in the bid. Search for a bid or a bid containing an item in the bidtree data structure 300 is analogous: inclusion branches are taken at the levels corresponding to items included in what is being searched for and exclusion branches are taken at levels corresponding to items not included in what is being searched for. One of skill will be familiar with many features of use of a binary tree which may be applied to the bidtree data structure 300.

Figure 4:
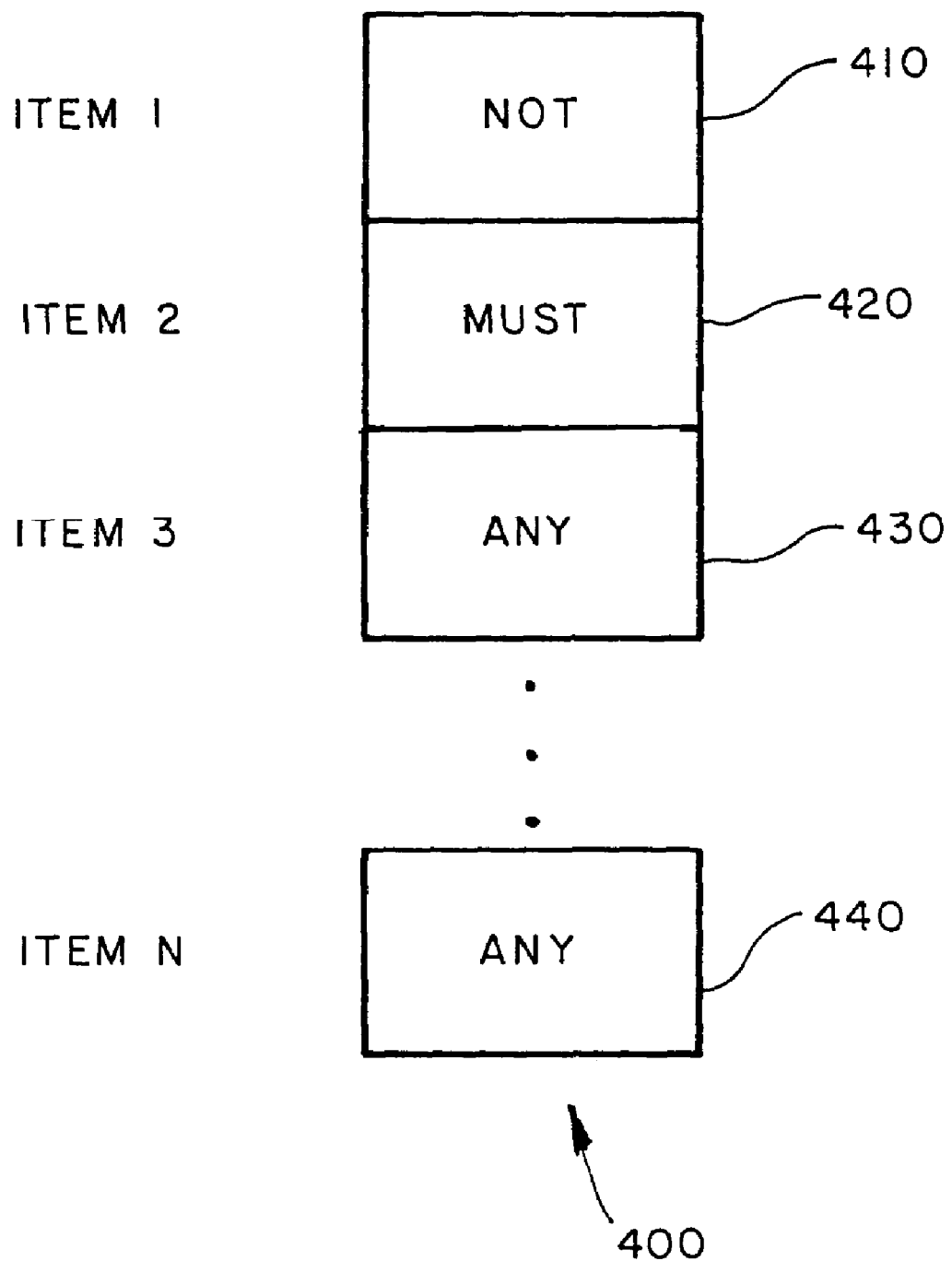
FIG. 4 depicts a stopmask data structure in accordance with an illustrative embodiment.

FIG. 4 illustrates a stopmask data structure 400. The stopmask data structure 400 is used with a bidtree data structure such as the bidtree data structure 300 in the illustrative embodiment. The stopmask data structure 400 may be embodied in a computer-readable medium such as a memory, e.g., storage 120. As one of skill in the art recognizes, when a computer-readable medium, such as a memory, is configured to embody the stopmask data structure 400, structure is imposed on the computer-readable medium.

In the illustrative embodiment, the stopmask data structure 400 is a vector stored in memory with one variable for each auctioned item. Thus, were there N items, there would be N variables in the stopmask data structure 400. Each variable may take one of three values: "NOT", "MUST", or "ANY". A stopmask data structure such as the stopmask data structure 400 may be used in conjunction with a bidtree data structure to increase the efficiency of a search of the bidtree data structure. Recall that levels in the bidtree data structure 300 correspond to items. Similarly, variables in the stopmask data structure 400 correspond to items. The values of the variables corresponding to an item in the stopmask data structure 400 aid in reducing a search of the bidtree data structure 300. If an item's variable takes on the value "NOT", in effect all parts of the bidtree data structure are pruned in place as it indicates that a search of the bidtree data structure should not follow branches which include that item, thus temporarily eliminating bids containing that item from being considered. If the item's variable takes on "MUST" then all other parts of the bidtree data structure are in effect pruned as only branches which include that item are followed. If an item's variable take on "ANY", then no restrictions are placed on a search in the bidtree data structure with respect to that item.

Shown in FIG. 4 are a first variable 410 corresponding to item {1} and having the value of "NOT", a second variable 420 corresponding to item {2} and having value "MUST", a third variable 430 corresponding to an item {3} and having value "ANY", and an Nth variable 440 corresponding to an item N and having value "ANY".

Figure 5:
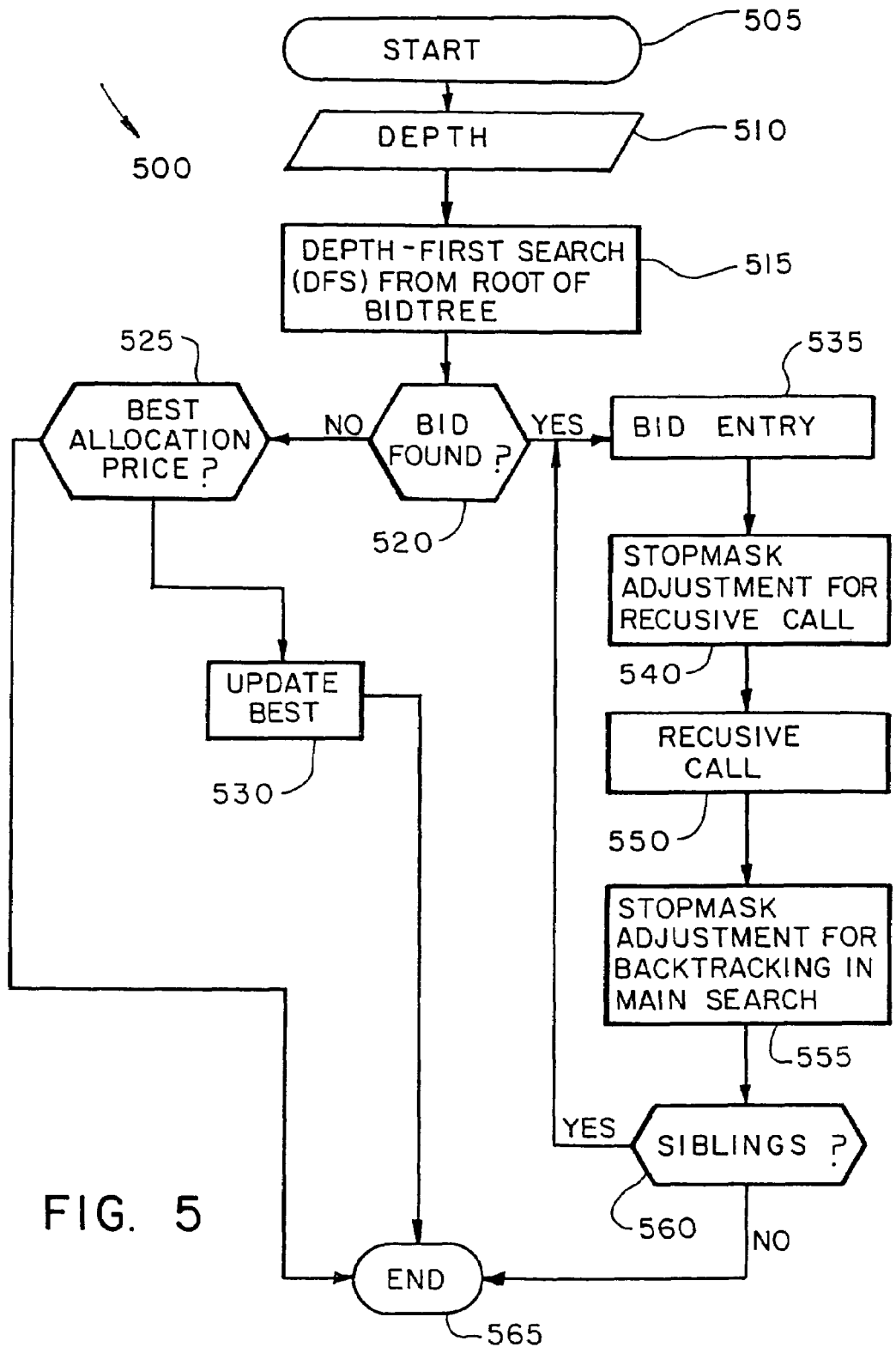
FIG. 5 depicts a "main search" method in accordance with an illustrative embodiment.

FIG. 5 illustrates a main search method 500. The main search method 500 uses two interleaved depth-first searches (DFS). One is the main search method 500 and the other occurs in the bidtree data structure and searches what bid to add next to a search path generated by the main search method 500. The main search method 500, in effect, generates a main search tree as described with reference to FIG. 3B and FIG. 6, however, in the illustrative embodiment, the main search method 500 does not store the main search tree in memory. In the illustrated embodiment, only the bids corresponding to one branch of the main search tree are stored. They are stored in a global data structure, an N-vector (not shown), where N corresponds to the number of items, and wherein each element of the vector contains a pointer to a bid in the bidtree data structure. As bids comprising a search path, i.e., an allocation, are generated they are stored in the N-vector and when backtracking and re-branching in the main search method 500 the N-vector is adjusted to substitute pointers to bids accordingly.

The main search method 500 operates recursively. Before the first call to the main search method 500 the stopmask data structure is initialized; the first element of the stopmask data structure is initialized to "MUST" and remaining elements of the stopmask data structure are initialized to "ANY". In addition, the main search method 500 is provided with the location of the bidtree data structure. In one embodiment, the bidtree data structure is stored globally. A feature of the invention is that the depth-first search of the bidtree data structure occurs in place; no open list or recursive call is required, and a pointer providing information of where the search focus is and knowledge of the previous direction suffice to conduct the search.

Processing initiates at a start terminal 505 and continues to receive a depth data block 510. The main search method 500 is passed as a parameter a depth. The depth refers to the position in the N-vector where this call of the main search method 500 should enter a bid it locates. Every time a node is to be added to the path in the main search method, a depth-first search is begun at the root of the bidtree data structure; new siblings are generated in the main search method 500 by backtracking in the search of the bidtree data structure. When going deeper the main search method 500, the depth is increased and when backtracking in the main search method 500 the depth is decreased.

Next a depth-first search from root of bidtree data structure process 515 begins which uses the stopmask data structure to conduct a depth-first search of the bidtree data structure for a bid. The stopmask data structure allows an efficient search of the bidtree data structure to occur. If an item's variable takes on the value "NOT", in effect, all parts of the bidtree data structure are pruned in place as it indicates in the DFS of the bidtree data structure to not follow branches which include that item, thus, temporarily eliminating bids containing that item from being considered. If the item's variable takes on "MUST" then all other parts of the bidtree data structure are in effect pruned as only branches which include that item are followed.

Next a bid found decision process 520 exits through its "No" branch if the depth-first search from root of bidtree data structure process 515 returned no bid. This will occur, for example, when all items are already in bids on the path. That is, if no bid is found it indicates the path is complete and processing enters a better allocation price decision process 525.

A variable stores a running total of the sum of the prices of the bids on the path. The better allocation price decision process 525 compares the running total with a best allocation price stored in memory (not shown). If the running total of the prices of the bids of the current path is greater than the best previously found, the best allocation price is updated and the current path stored by an update best process 530. As one of skill can appreciated, this feature allows the main search method to be used as an anytime algorithm as the best allocation price will contain a monotonically improving allocation. In one embodiment of the invention, a temporal limit is placed on the length of time allocated for the main search method to search. Next, or if the better allocation price decision process 525 exits through its "No" branch processing completes for this particular call through an end terminal 565.

When a bid is found by the depth-first search from root of bidtree data structure process 515, a bid entry process 535 enters a pointer to the bid in the N-vector at the depth received from the depth data block 510. In addition, the price of the bid is added to the running total of the prices of the bids on the path. As stated above, in the illustrated embodiment the main search method 500 uses a depth-first search and since a bid has been found a recursive call of the main search method 500 will be made. A stopmask data structure adjustment for recursive call process 540 sets variables in the stopmask data structure corresponding to items in the bid entered by the bid entry process 535 to "NOT". In addition, the item with the lowest index (i.e., lowest numbered item in the illustrated embodiment) that is not present in a bid already a member of the path is set to "MUST". In the illustrative embodiment, the variable to be set to "MUST" is located as follows. If there are one or more intervals between items in the bid entered by the bid entry process 535, for example, the items in the bid were {1, 4, 10}, the intervals are looped through until the first variable in the stopmask data structure set to "ANY" is found and this is set to "MUST". If there are no intervals between the items in the bid, or if all intervals have been examined without a variable set to "ANY" having been located, values after the bid with the highest index are searched through until first variable in the stopmask data structure set to "ANY" is located and it is set to "MUST". If the end of the stopmask data structure is reached, nothing is set to "MUST". In the illustrative embodiment, this information is not used to backtrack, although one of skill will quickly apprehend how it could be so used.

Next, a recursive call 550 of the main search method 500 is made. The depth variable passed to the recursive call 550 one greater than that received in the depth data block 510. When the recursive call 550 completes, it indicates that, ultimately, the end of a path has been reached and that the main search method 500 should backtrack one bid on the path and search for siblings for the bid entered by the bid entry process 535. A stopmask data structure adjustment for backtracking in main search process 555 executes. As a bid is backtracked in the main search method 500, variables in the stopmask data structure corresponding to items in the bid entered by the bid entry process 535 are changed back to "ANY" as well as the variable of the stopmask data structure that was set to "MUST". Recall that the N-vector contains a pointer to the location in the bidtree data structure of the bid entered by the bid entry process 535. The variable which is next set to "MUST" is found by a search based on items in the bid entered by the bid entry process 535. The process examines the items in the bid. The item in the bid with the smallest index has its corresponding variable in the stopmask data structure set to "MUST" and the remaining variables in the Stopmask data structure are set to "ANY".

Next, siblings for the bid entered by the bid entry process 535 are sought by continuing the search of the bidtree data structure begun by the depth-first search from root of bidtree data structure process 515. Recall that when a new level is generated by the main search method 500 a search from the root of the bidtree data structure is begun, but that when a sibling is generated in the main search method 500, only backtracking in the bidtree data structure occurs. The search of the bidtree data structure is resumed with the adjusted stopmask data structure and if a sibling is found, a siblings of bid decision process 560 exits through its "Yes" branch to enter this bid with the bid entry process 535 and make another recursive call of the main search method 500. If the resumed search of the bidtree data structure locates no siblings, the siblings of bid decision process 560 exits through its "No" branch and processing for this call of the main search method 500 completes through the end terminal 565.

Figure 3B:
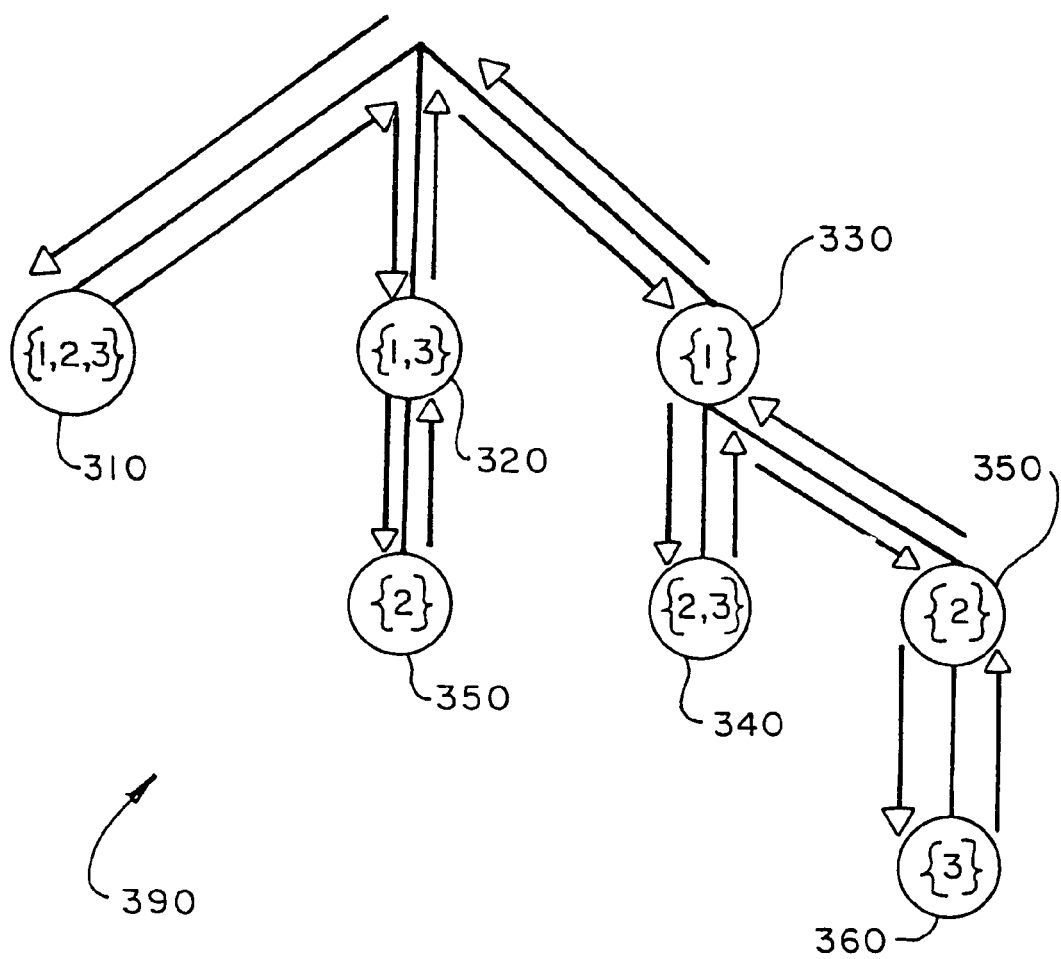
FIG. 3B depicts first main search tree corresponding to FIG. 3A in an illustrative embodiment.

An overview of the operation of the main search method 500 can now be provided making reference to FIG. 3A and FIG. 3B. As described below, the main search method 500 will be applied to the bidtree data structure 300. A first main search tree 390 illustrates how bids in the bidtree data structure 300 are examined. Recall that in accordance with the illustrative embodiment, the entirety of the first main search tree 390 need not be stored at any one time, only one branch.

The first call to the main search method 500 is made with depth=zero and a Stopmask of (1=MUST, 2=ANY, 3=ANY). A depth-first search is begun of the bidtree data structure which locates the first bid 310 (1,2,3). This bid is entered at place zero in the N-vector and its price $4.00 added to the running total. The stopmask data structure adjusted to (1=NOT, 2=NOT, 3=NOT). The depth is increased and a recursive call is made. This recursive call finds no bids in the bidtree data structure. Since $4.00 is the best price found thus far, it is entered as the best allocation price and the path consisting of the first bid 310 (1, 2, 3) is updated as the best path. This recursive call completes.

Returning to the calling process, the stopmask data structure is adjusted to (1=MUST, 2=ANY, 3=ANY) and the main search backtracks the first bid 310 (1, 2, 3). The depth is decreased and its price of $4.00 is decreased from the running total, bringing it to $0.00. Siblings for this bid are now sought by resuming the depth-first search in the bidtree data structure. The search in the bidtree data structure backtracks and locates the second bid 320 (1,3). This bid is entered at place zero in the N-vector and its price of $9.00 added to the running total for this path, bringing it to $9.00. The stopmask data structure is adjusted to (1=NOT, 2=MUST, 3=NOT), the depth increased and a recursive call is made. A new search from the root of the bidtree data structure finds the fifth bid 350 (2) which is entered at place 1 in the N-vector and the price of $1.00 added to the running total, bringing it to $10.00. The stopmask data structure is adjusted to (1=NOT, 2=NOT, 3=NOT), the depth increased and a recursive call is made. This recursive call finds no bids in the bidtree data structure. Since the running total for this path is $9.00+$1.00=$10.00 is replaces $4.00 as the best allocation price and this path is stored as the best path. This recursive call completes.

Returning to the calling process, the stopmask data structure is adjusted to (1=NOT, 2=MUST, 3=NOT) and the main search backtracks the fifth bid 350 (2). The depth is decreased and its priced decreased from the running total, bringing it to $9.00. Siblings for this bid are now sought by resuming the depth first search in the bidtree data structure. The search in the bidtree data structure backtracks and is unable to locate any bids. This recursive call completes.

Returning to the calling process, the stopmask data structure is adjusted to (1=MUST, 2=ANY, 3=ANY) and the main search backtracks the second bid 320 (1,3). The depth is decreased and its price is decreased from the running total, bringing it to $0.00. Siblings for this bid are now sought by resuming the depth-first search in the bidtree data structure. The search in the bidtree data structure backtracks and locates the third bid 330 (10. This bid is entered at place zero in the N-vector and its price of $1.00 added to the running total, bringing it to $1.00. The stopmask data structure is adjusted to (1=NOT, 2=MUST, 3=ANY). The depth is increased and a recursive call is made. A new search from the root of the bidtree data structure finds the fourth bid 340 (2,3) which is entered at place 1 in the N-vector and the price of $5.00 added to the running total, bringing it to $6.00. The stopmask data structure is adjusted to (1=NOT, 2=NOT, 3=NOT), the depth is increased and a recursive call is made. This recursive call finds no bids in the bidtree data structure. Since the running total for this path is $5.00+$1.00=$6.00 which is less than the currently best allocation price of $10.00, this recursive call completes.

Returning to the calling process, the stopmask data structure is adjusted to (1=NOT, 2=MUST, 3=ANY) and the main search backtracks the fourth bid 340 (2,3). The depth is decreased and the price is decreased from the running total, bringing it to $1.00. Siblings for this bid are now sought by resuming the depth-first search in the bidtree data structure. The search in the bidtree data structure backtracks and locates the fifth bid 350 (2). This bid is entered at place one in the N-vector and its price of $1.00 added to the running total, bringing it to $2.00. The stopmask data structure is adjusted to (1=NOT, 2=NOT, 3=MUST). The depth is increased and a recursive call is made. A new search from the root of the Bidtree data structure finds the sixth bid 360 (3) which is entered at place two in the N-vector and the price of $1.00 added to the running total, bringing it to $3.00. The Stopmask data structure is adjusted to (1=NOT, 2=NOT, 3=NOT), the depth is increased and a recursive call is made. This recursive call finds no bids in the bidtree data structure. Since the running total for the path is $1.00+$1.00+$1.00=$3.00 which is less than the currently best allocation of $10.00, this recursive call completes.

Returning to the calling process, the stopmask data structure is adjusted to (1=NOT, 2=NOT, 3=MUST) and the main search backtracks the sixth bid 360 (3). The depth is decreased and its price decreased from the running total, bringing it to $2.00. Siblings for this bid are now sought by resuming the depth first search in the bidtree data structure. The search backtracks but finds no bids. This recursive call completes.

Returning to the calling process, the stopmask data structure is adjusted to (1=NOT, 2=MUST, 3=ANY) and the main search backtracks the fifth bid 350 (2). The depth is decreased and its price decreased from the running total, bringing it to $ 1.00. Siblings for this bid are now sought by resuming the depth first search in the bidtree data structure. The search backtracks but finds no bids. This recursive call completes.

Returning to the calling process, the stopmask data structure is adjusted to (1=MUST, 2=ANY, 3=ANY) and the main search backtracks the third bid 330 (1). The depth is decreased and its price decreased from the running total, bringing it to $0.00. Siblings for this bid are now sought by resuming the depth first search in the bidtree data structure. The search backtracks but finds no bids. This recursive call completes, completing the main search method. The best allocation price of $10.00 remains stored along with its path of [(1,3), (2)] and the identity of the bidder of each of the bids in the winning allocation.

For illustration, the embodiment of the invention just described indicated that, when backtracking in the main search method, the best allocation price was decreased by the bid price of the bid being backtracked. In other embodiments of the invention, the best allocation price is passed as a parameter to the main search method which, upon completion of recursive calls, retains the appropriately reduced best allocation price of the calling process.

Figure 6:
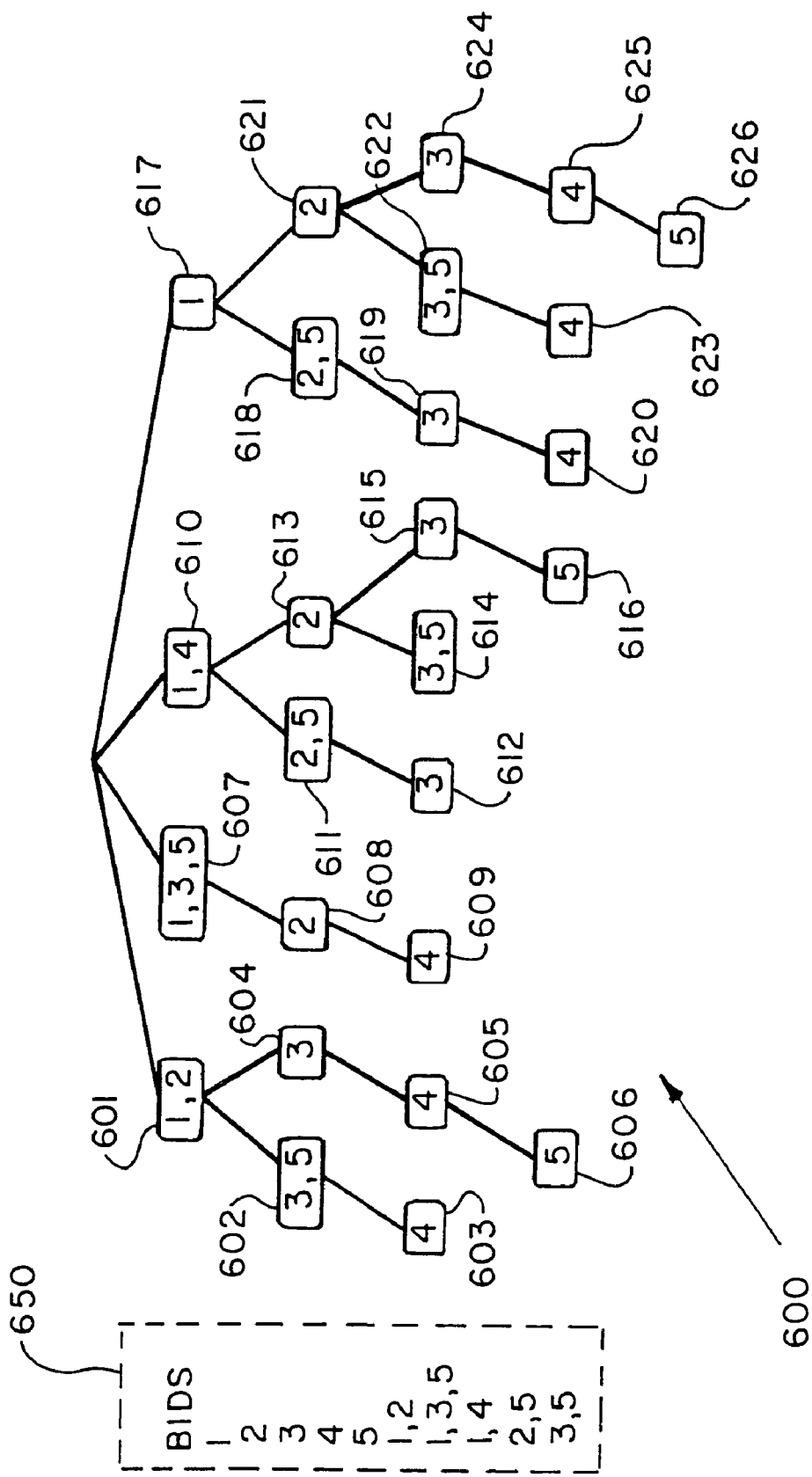
FIG. 6 depicts a second main search tree in accordance with an illustrative embodiment.

For further illustration, FIG. 6 illustrates a second main search tree 600 in accordance with an illustrative embodiment. Shown in addition to the second main search tree 600 are a plurality of bids 650. A bidtree data structure with the plurality of bids 650 having been entered is not depicted. As can be seen with reference to the second main search tree 600, at each level, only those successor bids are generated that include the item with the smallest index among the items that have not been allocated on that path of the search tree yet. In the second main search tree 600, this can be seen, for example, at the first level because all the bids considered at the first level include item Note that the minimal index does not coincide with the depth of the search tree in general. To further explain the illustrative embodiment, in FIG. 6, shown below in tabular form are the order (by reference numeral) in which the bids in the second main search tree 600 are entered by the main search method 500 in the second main search tree 600.

| Order | Reference Numeral |
|---|---|
| 1 | 601 |
| 2 | 602 |
| 3 | 603 |
| 4 | 604 |
| 5 | 605 |
| 6 | 606 |
| 7 | 607 |
| 8 | 608 |
| 9 | 609 |
| 10 | 610 |
| 11 | 611 |
| 12 | 612 |
| 13 | 613 |
| 14 | 614 |
| 15 | 615 |
| 16 | 616 |
| 17 | 617 |
| 18 | 618 |
| 19 | 619 |
| 20 | 620 |
| 21 | 621 |
| 22 | 622 |
| 23 | 623 |
| 24 | 624 |
| 25 | 625 |
| 26 | 626 |

In another embodiment of the invention, iterative deepening A* ("IDA*") is used rather than depth-first search by the main search method. IDA* is well-known to those of skill in the art, who with knowledge of this disclosure, will quickly apprehend embodiments of the invention involving IDA*. IDA* may be used either when the main search method is used for optimal allocation search or for superset pruning as is described below. The IDA* method finds the optimal solution while typically searching less than all of the main search tree. In these embodiments, some created paths are cut before reaching the length reached using the main search method 500 as described above. Embodiments using IDA* work with a heuristic function. The heuristic function generates an overestimate of what remaining items can contribute to the total price of the allocation. With that estimate, the main search is commenced as in FIG. 5 and a running total is kept. Added to the running total is the overestimate. If the sum of the running total and the overestimate is less than a threshold, further descent on that path is halted. In one embodiment the threshold is a target price chosen by a user. If the sum of the items on a path and the overestimate is less than the target price, then it is concluded that the remainder of that path cannot lead to an allocation with a price greater than the target price and further descent on the path is halted.

If a solution is found, with a threshold, in one embodiment it is reported as the allocation. In other embodiments, or when no solution is found, the threshold is decreased. In some embodiments, the process of searching for a solution and decreasing the threshold if none is found is repeated until a solution is found.

Some embodiments using IDA* use a heuristic function that is based on the sum of the maximum contributions of the items. An item's contribution to a bid is computed as the price of the bid divided by the number of items in the bid. This quantity is evaluated for all the bids which include that item and the maximum of these selected as that item's contribution. In some embodiments, the maximum contributions of items are computed before the main search method begins.

In other embodiments, the maximum contribution is recomputed during the main search method. When a bid is allocated on the path, items in that bid will not be found in remaining bids added to the path. Restricting consideration to bids containing items not already present on the path, an item's contribution is recomputed for these bids and the maximum taken.

One of skill in the art will be able to conceive of other heuristic functions. The present invention is not limited to the particular heuristic functions herein described, but rather encompasses other heuristics which those of skill will recognize as being rapidly computable and provably overestimate what the items currently not allocated on the path can contribute.

Figure 7:
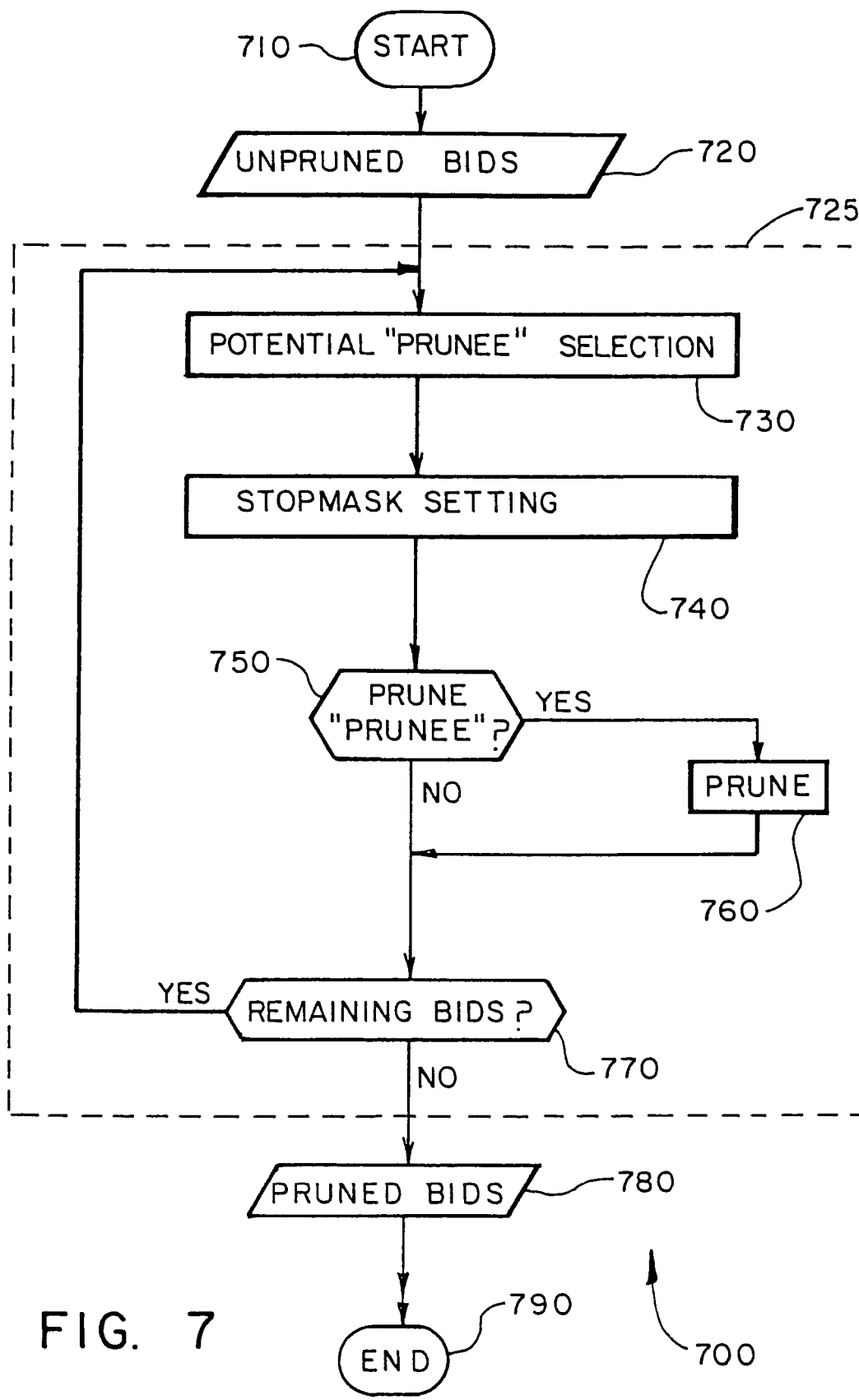
FIG. 7 depicts a "superset prune preprocessing" procedure in accordance with an illustrative embodiment.
Figure 8:
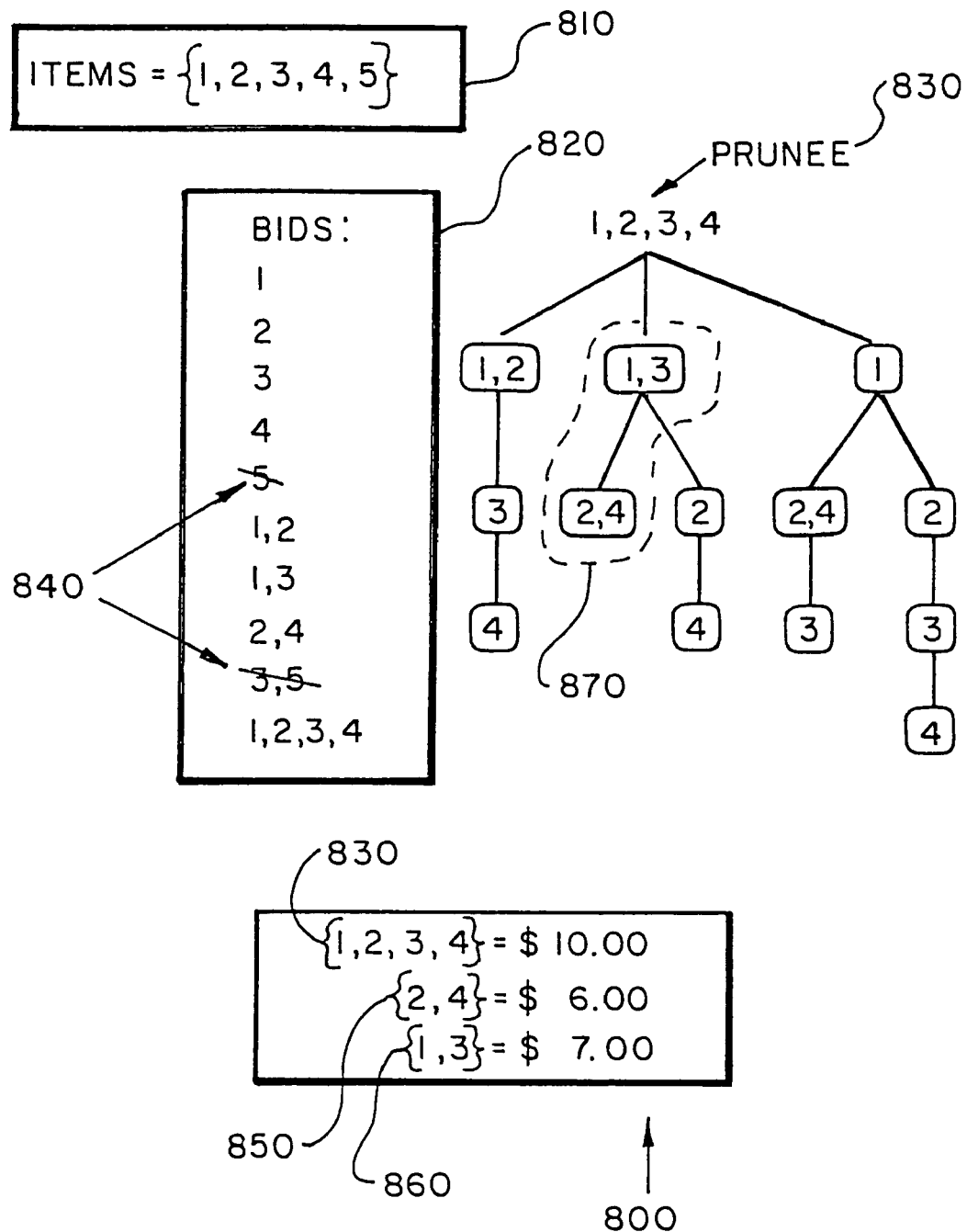
FIG. 8 depicts "superset prune preprocessing" data in accordance with an illustrative embodiment.

FIG. 7 illustrates a superset prune preprocessing procedure 700. The superset prune preprocessing procedure 700 examines the set of bids before the main search method 500 to eliminate noncompetitive bids thereby improving efficiency of the main search method 500. A bid, the potential "prunee" is noncompetitive if there is some collection of disjoint subsets of that bid's items such that the sum of the bid prices of the subsets is equal to or exceeds the price of the prunee bid. To determine this, a search is conducted for each bid (potential prunee) through all combinations of its subset bids. The search method is fundamentally the same as in the main search, except that for the items that are not in the prunee, "NOT" is kept in the stopmask data structure. This ensures that only subset bids contribute to the pruning of that bid.

Processing initiates at a start terminal 710 and continues to an unpruned bids data block 720 to receive the collection of unpruned bids in the bidtree. Next, a iterative block 725 is entered and a potential prunee selection procedure 730 selects a bid from the bidtree as a potential prunee. Processing continues to a stopmask setting procedure 740 that sets to "NOT" all variables in the stopmask data structure corresponding to items other than those in the potential prunee bid.

Next an prune "prunee"? decision procedure 750 determines whether to prune the potential prunee. To make this determination, the main search method 500 is called for the potential prunee with the stopmask data structure set by the stopmask setting procedure 740.

If the main search method 500 procedure determines there is some collection of disjoint subsets of items in the bid, the sum of whose bid prices on a path exceeds the prunee's price, the prune "Prunee"? decision procedure 750 exits through its "Yes" branch and processing continues to a prune procedure 760 which prunes the bidtree data structure to remove the prunee bid and that portion of the path from the root of the bidtree data structure to the prunee that leads only to the prunee. These aspects can be seen in greater detail with reference to FIG. 8 where a non-limiting example of superset prune preprocessing data 800 is depicted. Shown, are a set of items 810, of which there are five in the example: {1, 2, 3, 4, 5}. Also shown are a set of bids 820 and a prunee 830. Bids containing items not in the prunee 830 have had their corresponding variables in the stopmask data structure set to "NOT" as represented by a pair of cancellation indicia 840. As depicted, $10.00 is the bid price for the prunee 830, $6.00 is the bid price for a first pruner 850 {2,4}, and $7.00 is the price for a second pruner 860 {1,3}. In the example, the sum of the prices for the first pruner 850 and the second pruner 860 exceed that of the prunee 830. The first pruner 850 and the second pruner 860 correspond to a pruning path 870 in a reduced version of a main search tree that has the prunee 830 at its root.

After the prune procedure 760, or if the prune "prunee"? decision procedure 750 exits through its "No" branch, processing continues to a remaining bids? decision procedure 770 that controls exit from the iterative block 725. If not all bids have been evaluated for potential pruning, the remaining bids? decision procedure 770 exits through its "Yes" branch to reenter the iterative block 725. Otherwise, the remaining bids? decision procedure 770 exits through its "No" branch. A pruned bids data block 780 returns a pruned bidtree data structure and processing completes through an end terminal 790.

As one skilled in the art can appreciate, preprocessing may be done only partially if a user desires to save preprocessing time. With such partial pruning, some of the noncompetitive bids are left unpruned, but that will not affect the final result of the main search; however, the main search may complete less quickly. In one embodiment preprocessing time is limited. In yet another embodiment, a cap is placed on the number of pruner bids which may be combined in an attempt to prune a particular prunee. This type of cap restricts the depth of the search. In still yet another embodiment, a cap is placed on the number of items in a prunee bid. Accordingly, in this embodiment relatively larger bids may then not be targets of pruning. This implies a cap on the tree depth but it also reduces the width of the tree.

In a further aspect of the present invention, embodiments in which a cap is placed on processing time or the number of pruner bids, may be converted to into an anytime preprocessing algorithm by starting with small caps, conducting the preprocessing, increasing the cap, reconducting the preprocessing, and repeating. The process would stop (and main search would be started) when the preprocessing is complete (cap equals the number of items), when a preset preprocessing time limit expires, or when the user decides to stop preprocessing and to move to the main search phase.

According to another embodiment of the invention, the preprocessing algorithm may be converted into an approximation algorithm by allowing pruning when the sum of the pruners=prices exceeds a fixed fraction of the prunee bid's price. This embodiment allows more bids to be pruned which can make the main search run faster. As one of skill can appreciated, this may compromise optimality because some of the bids that are pruned in this way might have been winners in the optimal allocation.

Some embodiments of the invention use IDA* with the superset prune preprocessing procedure 700. According to these embodiments, the threshold is set as the prunee bid's price.

Figures 9, 10:
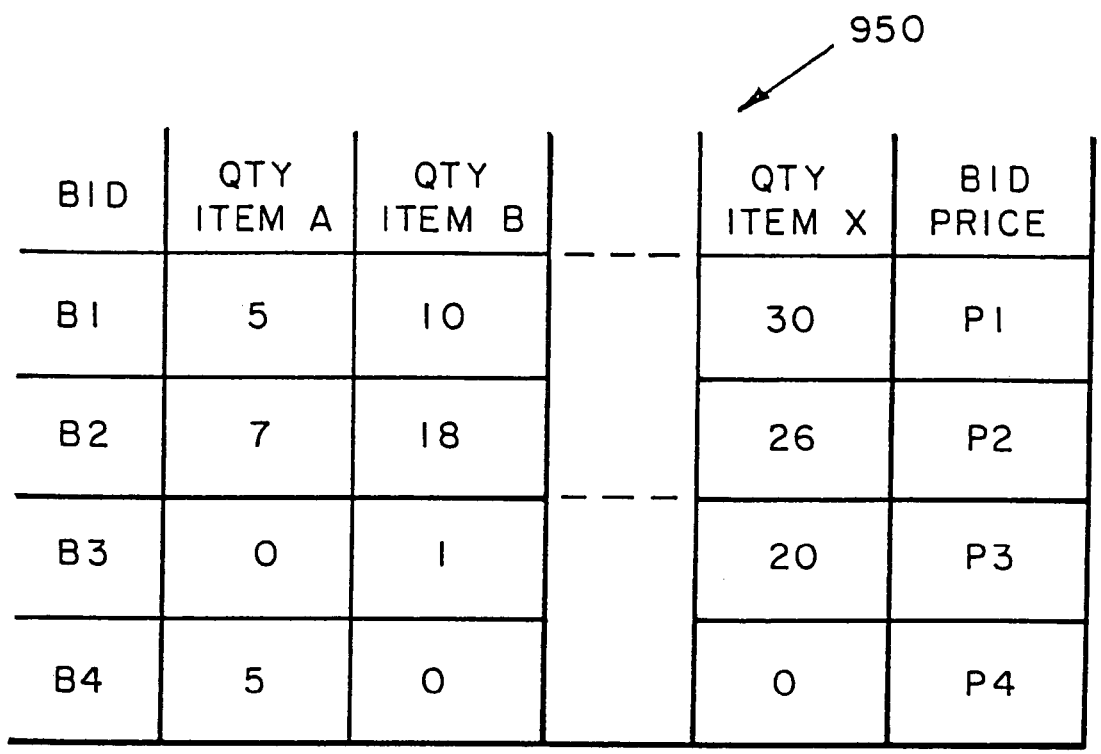
FIG. 9 is a list of bids, with each bid including one or more items, a quantity of each of the one or more items and a bid price.
FIG. 10 is an exemplary bid of the type received in a multi-unit combinatorial exchange.

With reference to FIG. 9, a method will be described of determining one or more winning bids in a multi-unit combinatorial auction. In contrast to a single unit combinatorial auction, where each bid includes only one quantity of each item included in the bid, in a multi-unit combinatorial auction each bid can include not only the item or items being bid upon, but a quantity therefor. Thus, as shown in FIG. 9, a group of bids 950 can include bid B1 which includes a quantity of 5 of item A, a quantity of 10 of item B, . . . , a quantity of 30 of item X, and a bid price P1. Similarly, each bid B2-B4 of the group of bids 950 includes for each item being bid on therein a desired quantity thereof and an overall bid price. Each bid of a multi-unit combinatorial auction can include for each item of a bid a quantity of zero or more thereof. Thus, as shown in bid B3, a bid can be placed for a quantity of 1 for item B, or any other item. Similarly, each item of a bid can include the quantity of zero therefor. Obviously, a bid quantity of zero for any item is a default condition for items not included in a bid.

In contrast to the single unit combinatorial auction discussed above in connection with FIGS. 3A, 3B, 6 and 8, wherein each item or group of items were tested for inclusion or exclusion from a branch of bidtree 300 having items representing its nodes, in a multi-unit combinatorial auction, each bid is evaluated for inclusion or inclusion in the branch of a search tree 900 having bids representing its nodes, described in greater detail hereinafter. Essentially, however, the problem of combining multiple bids in a multi-unit combinatorial auction involves determining for each bid or combination of bids whether such combination is allowed or forbidden based upon one or more predetermined rules or constraints, e.g., whether the quantity of each item in a bid, or the sum of each like item in a combination of bids, exceeds the total available quantity for that item. For example, in group of bids 950 shown in FIG. 9, the sum of the quantities of item A in bids B1 and B2 equal 12. If the total quantity of item A available, however, is only 10, then the combination of bids B1 and B2 is forbidden.

Moreover, if one or more auctioned items includes quantities that can be freely disposed of, this free disposal can also be utilized as a rule for combining the bids. For example, if a seller has 10 items for sale, he can decide to accept a bid or combination of bids for 8 of these items and to dispose of, either by giving away or discarding, the remaining 2 items. Thus, the ability to freely dispose of quantities of one or more items of an auction relaxes the constraint on which the bid or combination of bids that can be accepted in a multi-unit combinatorial auction. In contrast, the quantity of each auctioned item that cannot be disposed of for free must equal the total quantity available for sale. This inability to freely dispose of a quantity of one or more items of the auction may restrict whether a bid can be accepted or which bids can be combined. In a worst-case scenario, items in the auction having quantities that are not freely disposable may result in few or no possible bids or combination of bids. Typically, however, multi-unit combinatorial auctions have a mix of items that have quantities that can be freely disposed of and items that cannot be disposed of for free.

In accordance with the method, data regarding one or more items and the total quantity of each item available for sale is input, for example, via input/output system 130 into storage 120 of computer system 100 shown in FIG. 1. As discussed above, the quantity of each item can be zero or more. This input data is then made available to bidders either at computer system 100 or remotely via a network system or the Internet to computers (not shown) of the bidders.

After reviewing the items for sale and the total quantity of each item available for sale, the bidder dispatches to the auctioneer, e.g., at computer 100, one or more bids. Each bid includes one or more items and for each item a quantity thereof. Each bid also includes a bid price. Upon receiving a plurality of bids from one or more bidders, e.g., at computer system 100, a method in accordance with the present invention is invoked for determining the winning bid or winning combination of bids that maximizes the revenue from the sale of the items.

Essentially, this method includes determining from plural combinations of bids which bid or combination of bids has an optimal sum of prices. More specifically, the method combines the received bids in numerous unique manners to form plural combinations of bids, with each combination including a unique subset of the received bids. From these plural combinations of bids is determined an optimal combination which has an optimal sum of prices. That is, the sum of the prices of the optimal combination is greater than the sum of the prices of the other combinations of bids. As discussed above, when all or part of the quantity of at least one item of the auction can be disposed of for free, the optimal combination of bids can include for this item a quantity which is less than the total quantity available for sale. In contrast, if the auction includes items that cannot be disposed of for free, the quantity of each of these items in the combination of bids must be equal to the total quantity available for sale. Operating under the constraint of free disposal and/or the constraint of lack of free disposal, the method of the present invention can determine from plural combinations of the received bids which combination of bids has an optimal sum of prices and meets the free disposal and/or lack of free disposal constraints. Once the combination of bids having an optimal sum of prices is identified, the auctioneer can declare the bids forming this combination as the winning bids in the auction.

In addition, the method generally described above for multi-unit combinatorial auctions can be utilized for multi-unit combinatorial reverse auctions. In multi-unit combinatorial reverse auctions, however, the method determines from the plural combination of bids an optimal combination which has a minimal sum of prices, as compared to an optimal sum of prices in the multi-unit combinatorial auction. When all or part of the quantity of at least one item of the optimal combination in a multi-unit combinatorial reverse auction can be disposed of for free, the quantity of the item in the optimal combination must be greater than or equal to the total quantity of the item desired to be purchased. That is, the seller or buyer of an item in a multi-unit combinatorial reverse auction may be willing to give away or dispose of additional quantities of an item for which there is no corresponding desire on the part of a buyer to purchase or for which a seller may be unwilling or not able to dispose. An example of such an item might be a spoilable food item. In contrast, if the quantity of each item of the optimal combination in a multi-unit combinatorial reverse auction cannot be disposed of for free, the quantity of that item in the optimal combination must be equal to the quantity desired to be purchased. This ability or inability to freely dispose of quantities of one or more items in a multi-unit combinatorial reverse auction determines which optimal combination of bids has a minimal sum of prices.

Still further, the method in accordance with the present invention can also be utilized to determine one or more winning bids in a multi-unit combinatorial many-to-many auction, a.k.a., a multi-unit combinatorial exchange. In contrast to the multi-unit combinatorial auction and reverse auction discussed above, each item, and its associated quantity, of each bid in a multi-unit combinatorial exchange is tagged either for purchase or for sale, and the price is tagged as a price to be received or a price to be paid. For example, as shown in FIG. 10, a bidder may wish to dispose of a quantity of 5 of item A, acquire 10 of item B, and receive a payment of P. In the example, shown in FIG. 10, when a bidder wishes to receive a quantity of an item or receive payment, this is indicated by a negative sign in front of the quantity or the payment price. Thus, items of a bid having a positive quantity associated therewith are tagged for disposition, while items having a negative quantity associated therewith are tagged for acquisition. Moreover, a bid having a positive price indicates the bidder desires to pay the price, while a negative price indicates the bidder wishes to be paid the price. It is to be appreciated, however, that the positive and negative indicia can be used to indicate a desire to acquire and dispose of, respectively, while a positive and negative price can be used to indicate a desire to receive money and pay money, respectively. In addition, while the quantities in examples shown in FIG. 10 are tagged with a positive or negative indicia, the item itself could be tagged with a positive or negative indicia, the choice of tagging either the item or its associated quantity with a positive or negative indicia being one of choice.

Next, in a multi-unit combinatorial exchange, the method combines the received bids in plural unique manners to form plural combinations of bids. From these plural combinations of bids, the method determines which combination is optimal in terms of (i) maximizing a difference between the sum of the prices to be paid for the combination minus the sum of the price to be received for the combination; (ii) maximizing the sum of prices to be paid for the combination; (iii) maximizing the sum of the prices to be received for the combination; or (iv) maximizing a function that processes the sum of the prices to be paid for the combination and the sum of the prices to be received.

Regarding (iv) above, if the sum of prices to be paid is A and if the sum of prices to be received is B, then this function can be generally expressed as f (A,B). Some non-limiting examples of this function include: the average of A+B; a first percentage of A summed with a second percentage of B, where the first and second percentages can be the same or different; and the like.

In a multi-unit combinatorial exchange, when all or part of the quantity of at least one item of the combination can be disposed of for free, the quantity of that item in the combination to be purchased can be less than or equal to the quantity for sale. That is, it is not necessary in the optimal combination to include the available quantity for sale of each item that includes quantities thereof that can be given away or disposed of for free. In contrast, the quantity of each item of the combination to be purchased that cannot be disposed of for free must equal the quantity for sale. Once the optimal combination in a multi-unit combinatorial exchange is determined, the bids forming the optimal combination are declared the winning bids.

As can be seen, a method in accordance with the present invention can be utilized for determining winning bids in a multi-unit combinatorial auction, reverse auction and/or an exchange. In accordance with the present invention, however, this method can be modified to provide improved results. For example, one or more bids of the winning combination of bids can be accepted in part, e.g., a first percentage of the bid quantity and/or a second percentage of the bid price, where the first and second percentages preferably are the same. Moreover, two or more of the received bids can be encoded to be mutually exclusive and/or mutually non-exclusive of each other. For example, as shown in FIG. 11, the combination of bids 960 includes a logical "OR" constraint between bids B1 and B2 and a logical "XOR" constraint between this combination and bid B3. It is to be appreciated that the logical "OR" constraint is mutually non-exclusive while the logical "XOR" constraint is mutually exclusive. Other non-limiting combinations of bids utilizing the logical "OR" and/or "XOR" constraints are shown as combination of bids 962-980 of FIG. 11.

An example of the use of the mutually non-exclusive and mutually exclusive constraints will now be described. Assume a bidder submits a bid B1 for item {1} at a price of $3.00; a bid B2 for item {2} at a price of $4.00; and a bid B3 for items {1,2} at a price of $5.00. Ideally, if the bidder is to receive items {1,2}, the bidder desires that bid B3 be accepted. However, an auctioneer seeking to maximize the value of the auction, would declare bids B1 and B2 the winning bids. Thus, instead of getting items {1,2} for $5.00, the bidder acquires items {1,2} for $7.00. To avoid this problem, a bidding language that utilizes the mutually exclusive "XOR" constraint and/or the mutually non-exclusive "OR" constraint is utilized. In the present example, the mutually exclusive "XOR" constraint is applied between bids B1, B2 and B3 to indicate that the bidder wants either bid B1, B2 or B3 to be accepted but no combinations of these bids to be accepted.

In another example, assume that a bidder submits bids B1, B2 and B3 for three different items {1},{2},{3}, respectively. Further, assume the bidder wishes to acquire either item {3} or one of items {1}or {2}. This preference can be expressed as shown in the combination of bids 960 in FIG. 11. In another example, assume that the bidder wishes to acquire item {3} and may also wish to acquire either item {1} or item {2}. This preference can be expressed as shown in the combination of bids 962 in FIG. 11. Thus, by combining groups of bids, either mutually exclusively or mutually non-exclusively, and combining the bids within each group of bids the other of mutually exclusively or mutually non-exclusively, bidder preferences for combination of bids can be expressed. To this end, the "OR" and "XOR" constraints can be utilized with bids and/or groups of bids to express preferred bid combinations that achieve a desired bid outcome for the bidder.

Preferably, the encoding of two or more of the received bids to be mutually exclusive and/or mutually non-exclusive of each other can be imposed by any party participating in the auction, e.g., buyer, seller or auctioneer.

In the context of a multi-unit combinatorial auction and/or multi-unit combinatorial reverse auction, a reserve price can be assigned to one or more sets/bids of one or more of the input items and associated quantities for each of the items. In the context of a multi-unit combinatorial auction, a reserve price is one where a seller is indecisive about selling a particular quantity of one or more items. In the context of a multi-unit combinatorial reverse auction, a reserve price is one where a buyer is indecisive about buying a particular quantity of one or more items. As above, two or more of the reserve priced sets/bids can be encoded to be mutually exclusive and/or mutually non-exclusive. To this end, encoding is done by logical "OR" constraints between two or more reserve priced sets/bids that are to be mutually non-exclusive, and by logical "XOR" constraints between two or more reserve priced sets/bids that are to be mutually exclusive. More specifically, one of mutually exclusively or mutually non-exclusively constraints can be utilized to combine groups of reserve priced bids, and the other of the mutually exclusively or mutually non-exclusively constraints can be utilized to combine the reserve priced bids within each group. Like above, the logical "OR" constraint is mutually non-exclusive and the logical "XOR" constraint is mutually exclusive. Preferably, this encoding can be imposed by any participant in the auction In the context of a multi-unit combinatorial auction, reverse auction and/or exchange, it is desirable during the course thereof to output data regarding its status, such as one or more of the received bids or parts thereof, one or more bids or parts thereof of the optimal combination of bids thus far, and/or a price quote for at least one set of one or more of the input items and associated quantities of each item in the at least one set. It is also desirable to permit new bids to be received in response to the output of this data, in order to permit further optimization of the results thereof.

Figure 12:
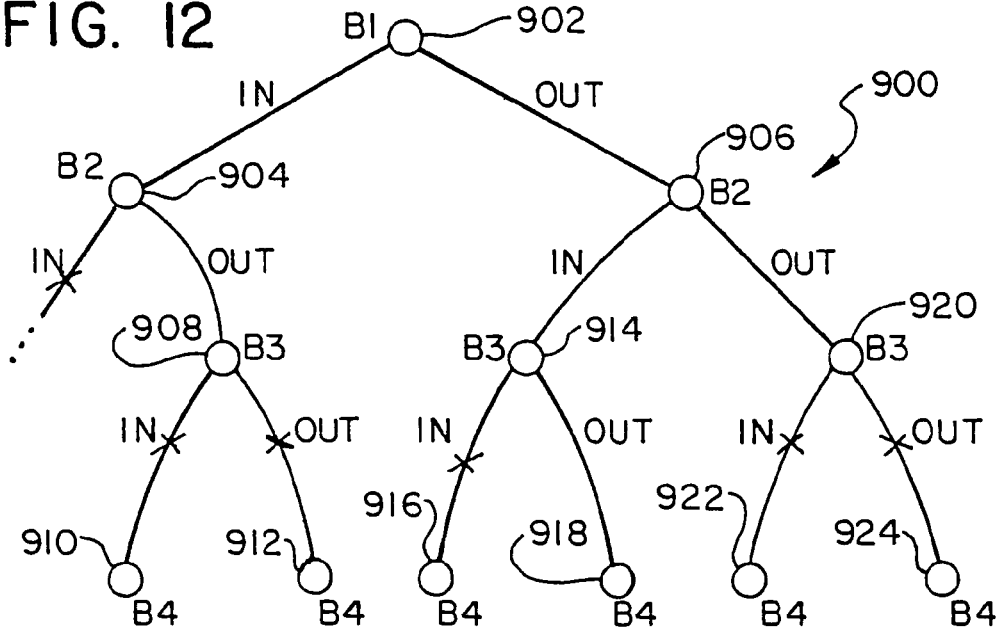
FIG. 12 is an exemplary bid and branch search tree structure including an array of bids, where each bid includes one or more items, an associated quantity of each item and a bid price, and the total quantity available of each item in an auction.

With reference to FIG. 12, a branch on bids (BOB) search method in accordance with the present invention for determining from a plurality of received bids, the plural combinations of possible bids that will satisfy any imposed constraints as well as determining an optimal combination of bids for a multi-unit combinatorial auction will now be described. It is to be appreciated, however, that the BOB search method can also be utilized for determining an optimal combination of bids in a multi-unit combinatorial reverse auction and/or exchange.

The BOB search method utilizes a search tree structure 900 that branches on bids. An exemplary search tree 900, shown in FIG. 12, includes four bids, B1-B4, with each bid B1-B4 having a listed quantity of each of items A-C and bid prices P1-P4, respectively. In operation, the entirety of search tree 900 is not stored in memory at any one time, only one branch and, more particularly, only the one branch being generated by the BOB search method. In operation, the BOB search method determines a candidate allocation by associating one of the bids B1-B4 to the root node 902 of search tree 900. In FIG. 12, bid B1 is associated with node 902 in a first level of search tree 900. At node 902, the BOB search method determines whether the quantity of each item of bid B1 exceeds the total quantity available. As shown in FIG. 12, the total quantity of items A, B and C of bid B1 does not exceed the total quantity of items A, B and C available. Thus, the BOB search method continues.

Depending upon the inclusion or exclusion of bid B1 in a branch, a new node 904 or 906, respectively, is appended to node 902 in a second level of search tree 900. In search tree 900, inclusion branches depend to the left of their respective parent nodes and include the word "IN" adjacent the branch, while exclusion branches depend to the right of the their respective parent nodes and include the word "OUT" adjacent the branch. Assuming that node 904 is appended, the BOB search method associates with node 904 one of the bids that has not already been considered for attachment to the branch. For example, bid B2 is associated with node 904. Next, another candidate allocation is determined that includes the combination of bids B1 and B2, that lie on the search path that includes nodes 902 and 904. More specifically, the quantity of item A in bids B1 and B2 are summed together; the quantity of item B in bids B1 and B2 are summed together; the quantity of item C in bids B1 and B2 are summed together; and bid prices P1 and P2 are summed together. If the sum of the quantity of any item exceeds the total quantity available for that item, then bid B2 is excluded from the branch. In contrast, if the sum of the quantities of each item in bids B1 and B2 does not exceed the total quantity available for that item, then bid B2 is included in the branch. In the present example, the sum of the quantities of item C of bids B1 and B2 exceed the total quantity available of item C. Thus, search tree 900 will exclude bid B2 in further searches along the branch. This exclusion is illustrated in search tree 900 by pruning the entire inclusion branch of node 904. This pruning is illustrated by the "X" indicia in the inclusion branch depending from node 904.

Next, node 908 is appended to the exclusion branch of node 904 in a third level of search tree 900. The BOB search method associates with node 908 one of the bids that has not already been considered for attachment to the branch being generated. For example, bid B3 is associated with node 908. Next, another candidate allocation is determined that includes the combination of bids B1 and B3, that lie on the search path that includes nodes 902, 904 and 908. From this combination the BOB search method determines the sum of item A in bids B1 and B3; the sum of item B in bids B1 and B3; the sum of item C in bids B1 and B3; and the bid price P1 and P3 of bids B1 and B3. As can be seen, the sum of each of the items does not exceed the total quantity available. Thus, further searching from node 908 is needed.

Next, a node 910 is appended to the inclusion branch of bid B3 in a fourth level of search tree 900 and a bid not already considered for attachment to the branch being generated is associated with node 910. In this case, bid B4 is assigned to node 910. Next, another candidate allocation is determined that includes the combination of bids B1, B3 and B4 that lie on the search path that includes nodes 902, 904, 908 and 910. From this combination, the sum of each like item in bids B1, B3 and B4, and the sum of the bid prices P1, P3 and P4 are determined. As above, if the sum of any like item in bids B1, B3 and B4 exceeds the total quantity available for that item, the inclusion branch from node 908 is pruned. In the present example, the sum of item B in bids B1, B3 and B4 exceeds the total quantity available. Thus, the inclusion branch from node 908 that extends to node 910 is pruned. This pruning is shown by an "X" indicia through this inclusion branch.

Since all of the available bids, e.g., bids B1-B4, have been tested for inclusion in this branch, the BOB search method backtracks from node 910 to node 908, appends a node 912 to the exclusion branch of bid B3 in the fourth level of search tree 900, and associates with node 912 one of the bids, e.g., bid B4, which has not already been considered for attachment to the branch being generated, i.e., the branch that now includes node 912. Next, another candidate allocation is determined that includes the combination of bids B1 and B4 that lie on the search path that includes nodes 902, 904, 908 and 912. From this combination, the sum of each item in bids B1 and B4 and the bid prices P1 and P4 are determined. As above, if the sum of any like item from bids B1 and B4 exceeds the total quantity available, the branch of the tree including node 912 is pruned. In the present example, the sum of item B in bids B1 and B4 exceeds the total quantity available. Thus, the branch including node 912 is pruned from the tree, as shown by the "X" indicia.

To avoid having to sum each like item and the bid prices of bids in a branch each time a new bid is added to the branch, a running tally, or total, of the sum of the bid prices and the quantity of each like item of the bids in a branch is maintained. When a branch is extended by appending a new bid to an existing branch, the quantity of each of the item of the new bid is added to the running total of each like item, and the bid price of the new bid is added to the running total of bid prices determined in the parent node from which the node of the new bid depends. When backtracking or returning along the nodes of a branch, for example, to find siblings for bids, the quantity of each item and the bid price of the bid associated with the node that is backtracked are deleted from the running total of the sum of each item and the sum of the bid prices, respectively.

Thus far, in the example of the search tree 900 shown in FIG. 12, only bids B1 and B3 can be combined without exceeding the available quantity of one of the items included in bids B1 and B3. Since the search path including the combination of bids B1 and B3 is the best combination of bids found thus far, bids B1 and B3 are entered or saved as the best allocation and the sum of prices P1 and P3 is entered or saved as the best allocation price. Entry of the best allocation and the best allocation price occurs each time a new allocation price exceeds a previously entered best allocation price. To ensure the best allocation and the best allocation price are entered, prior to initiating the search, the BOB search method initializes the best allocation and the best allocation price. In the context of a multi-unit combinatorial auction, the best allocation price is initialized to zero. In contrast, in a multi-unit combinatorial reverse auction, the best allocation price is initialized to a very large number, preferably infinity.

Next, the BOB search method backtracks each node searching for siblings of bids. Thus far, in the present example, since all of the bids including bid B1 have either been searched or pruned, the BOB search method returns to node 902 and commences to generate branches of search tree 900 that exclude bid B1. More specifically, the BOB search method appends node 906 to the exclusion branch of node 902 and assigns to node 906 one of the bids not already considered for attachment to this branch. In this example, bid B2 is associated with node 906 in the second level of search tree 900. Since bid B1 is not included in this branch, another candidate allocation is determined that only includes bid B2 that lies on the search path that includes nodes 902 and 906. Thereafter, the BOB search method determines if the quantity of each item in bid B2 exceeds the total quantity available.

Finding that no item in bid B2 exceeds the total quantity available, the BOB search method generates node 914 attached to the inclusion branch of node 906 in the third level of search tree 900 and associates with node 914 a bid not previously considered for attachment to this branch. In this example, bid B3 is associated with node 914. Next, another candidate allocation is determined that includes the combination of bids B2 and B3 that lie on the search path that includes nodes 902, 906 and 914. From this combination, the BOB search method determines whether the sum of each item in bids B2 and B3 exceed the total quantity available for that item. In the illustrated example, the sum of item A in bids B2 and B3; the sum of item B in bids B2 and B3; and the sum of item C in bids B2 and B3 do not exceed the total quantity available for each of these items. The BOB search method also sums bid prices P2 and P3 for bids B1 and B3. If the sum of bid prices P2 and P3 exceeds the best allocation price, the sum of bid prices P2 and P3 replaces the best allocation price and bids B2 and B3 replace the best allocation.

If all of the available bids have not been tested for inclusion on the branch, the BOB search method appends a node 916 to the inclusion branch of node 914 in the fourth level of search tree 900 and associates with node 916 a bid, e.g., bid B4, which has not already been considered for attachment to this branch. Next, another candidate allocation is determined that includes the combination of bids B2, B3 and B4 that lie on the search path that includes nodes 902, 906 and 914 and 916. From this combination, the BOB search method then determines if the sum of each like item in bids B2-B4 exceeds the total quantity available for that item. In the example of search tree 900 shown, the sum of item B of bids B2-B4 exceeds the total quantity available for item B. Thus, the inclusion branch of bid B3 connected to node 916 is pruned, as shown by the "X" in this inclusion branch.

Next, the BOB search method backtracks from node 916 and returns to node 914 to search for siblings of node 916 appended to the exclusion branch of node 914. To this end, the BOB search method appends a node 918 to the exclusion branch of node 914 in the fourth level of search tree 900 and associates with node 918 a bid, e.g., bid B4, not already considered for attachment to this branch. Next, another candidate allocation is determined that includes the combination of bids B2 and B3 that lie on the search path that includes nodes 902, 906, 914 and 918. From this combination, the BOB search method then determines if the sum of like items in bids B2 and B4 exceed the total quantity available for that item. In the illustrated example, the sum of item A in bids B2 and B4; the sum of item B in bids B2 and B4; and the sum of item C in bids B2 and B4 do not exceed the available quantity of each item. Thus, the BOB search method determines if the sum of bid prices P2 and P4 exceed the best allocation price. If so, the sum of bid prices P2 and P4 replace the best allocation price and bids B2 and B4 replace the best allocation.

Continuing, the BOB search method backtracks from nodes 918 and 914 and returns to node 906, where it determines that the exclusion path from node 906 has not been tested. Recall that each time a node is backtracked, the quantity of each item and the bid price represented by the bid associated with that node is subtracted from the running total of each item and bid price.

Next, the BOB search method appends a node 920 to the exclusion path of node 906 in the third level of search tree 900 and associates with node 920 a bid, e.g., bid B3, not already considered for attachment to this branch. Next, another candidate allocation is determined that only includes bid B3 that lies on the search path that includes nodes 902, 906 and 920. The BOB search method then determines if each item in bid B3 exceeds the total quantity available for that item. In the illustrated example, the quantity of each item of bid B3 does not exceed the total quantity available for that item. Next, the BOB search method determines if bid price P3 exceeds the best allocation price. If so, bid price P3 replaces the best allocation price and bid B3 replaces the best allocation. If not, however, the best allocation price is not replaced and bid B3 does not replace the best allocation.

Next, the BOB search method appends a node 922 to the inclusion path of node 920 in the fourth level of search tree 900 and associates with node 922 a bid, e.g., bid B4, not already considered for attachment to this branch. Next, another candidate allocation is determined that includes the combination of bids B3 and B4 that lie on the search path that includes nodes 902, 906, 920 and 922. The BOB search method then determines if the sum of each like items in bids B3 and B4 exceed the total quantity available for that item. In the example shown, the sum of item B in bids B3 and B4 exceeds the total quantity available. Thus, the BOB search method prunes the inclusion path of bid B4 from node 920 as shown by an "X" in this inclusion path.

Backtracking from node 922 and returning to node 920, the BOB search method appends a node 924 to the exclusion branch of node 920 in the fourth level of search tree 900, and associates with node 924 a bid not considered for attachment to this branch. In this case, bid B4 is associated with node 924. Next, another candidate allocation is determined that only includes bid B4 that lies on the search path that includes nodes 902, 906, 920 and 924. The BOB search method then determines if the quantity of each item in bid B4 exceeds the total quantity available. If not, the above search method determines if bid price P4 exceeds the best allocation price. If so, bid price P4 replaces the best allocation price and bid B4 replaces the best allocation. If not, the best allocation price is not replaced and bid B4 does not replace as the best allocation.

When the BOB search method completes its evaluation of all the inclusion and exclusion branches of search tree 900, the best allocation and the best allocation price represent the combination of bids having an optimal sum of prices. At the conclusion of an auction, the combination of bids having the optimal sum of prices are designated the winning bids of the auction.

Next, the underlying steps of the BOB search method will be described in sufficient detail to enable one skilled in the art of combinatorial forward auctions, reverse auctions and/or exchanges to make and use the invention. Specifically, the set of bids that are labeled winning on the path to the current search node is called IN, and the set of bids that are winning in the best allocation found so far is IN*. Let f* be the value of the best solution found so far. Initially, IN=0, IN*=0, and f*=0. Each bid, $B_j$, has an exclusion count, $e_j$, that stores how many times $B_j$ has been excluded by bids on the path. Initially, $e_j$=0 for all j ∈{1,2, . . . , n}. M' is the set of items that are still unallocated, g is the revenue from the bids with $x_j$=1 on the search path so far, and h is an upper bound on how much the unallocated items can contribute (let max{0}=0). Initially, g=0. The search is invoked by calling from a main calling routine the BOB search method, which includes the following steps:

1. If g>f*, then IN*←IN and f*←g;

2. $h \leftarrow \sum_{i \in M'} c(i)$, where $c(i) \leftarrow \max_{j | i \in S_j, e_j=0} Pj/|Sj|$;

3. If g+h≦f*, then return to main calling routine;
4. Choose a bid $B_k$ for which $e_k$=0, If no such bid exists, then return to the main calling routine;
5. IN←IN∪{$B_k$}, $e_k$←−1;
6. For all $B_j$ such that $B_j \neq B_k$ and $S_j \cap S_k \neq 0$, $e_j \leftarrow e_j+1$;
7. BOB (M'-$S_k$, g+$p_k$);
8. IN←IN−{$B_k$};
9. For all $B_j$ such that $B_j \neq B_k$ and $S_j \cap S_k \neq 0$, $e_j \leftarrow e_j-1$;
10. Perform BOB (M', g); and
11. $e_k$←0, return to main calling routine.

The method for winner determination disclosed in connection with FIGS. 3A, 3B, 6 and 8, branches on items. The children of a search node are those bids that include the smallest item that is still unallocated, and do not share items with any bid on the path thus far. If, as a preprocessing step, a dummy bid of price zero is submitted for every individual item that received no bids alone (to represent the fact that the auctioneer can keep items), then the leaves of this tree correspond to feasible solutions to the winner determination problem. Clearly, the branching factor is at most n+m, where n represent the number of received bids and m represent the number of dummy bids, and the depth is at most m, so the complexity is O((n+m)$^m$), which is polynomial in bids. This is desirable since the auctioneer can usually control how many items are auctioned, but cannot control how many bids are received.

On the other hand, the BOB search method branches on bids (inclusion or exclusion, i.e., $x_j$=1 or $x_j$=0) instead of items. The branching factor is 2 and the depth is at most n, thus, the BOB search method is O(2n), which is exponential in bids. However, the nodes (both interior and leaf) correspond to feasible solutions to the winner determination problem. Therefore, the number of nodes in this tree is the same as the number of leaves in the old formulation.

The main advantage of the BOB search method is that it applies the artificial intelligence (AI) principle of least commitment. In the BOB search method, the choice in step 4 above only commits one bid, while the method for winner determination disclosed in connection with FIGS. 3A, 3B, 6 and 8, the choice of an item committed all the remaining bids that include the item. The BOB search method allows more refined search control, in particular, better bid ordering. A secondary advantage of the BOB search method is that there is no need to use dummy bids.

Next, bid ordering heuristics for improving search speed in the BOB search method will be described. The search speed of the BOB search method can be increased by improving the pruning that occurs in step 2 above. Essentially, this is done by constructing many high-revenue allocations early, for example, bid ordering in step 4. In other words, bids are chosen that contribute a lot to the revenue, and do not retract from the potential contribution of other bids by using up many items. At a search node, a bid is chosen that maximizes $p_j/|S|^\alpha$ (to avoid scanning the list of bids repeatedly, the bids are preferably sorted in descending order before the search begins) and has $e_j$=0. Intuitively, $\alpha$=0 gives too much preference to bids with many items, and ∝=1.5 gives too much preference to bids with few items. It has been determined that simply inserting bids into IN* in highest $p_j/|S|^\propto$ first order (as a bid is inserted, bids that share items with it are discarded), ∝=0.8 gives the best worst-case bound. Desirably, not only are high-valued allocations constructed, but also many allocations are constructed early to increase the chance of high-valued ones. Since bids with few items lead to deeper search than bids with many items (because bids with many items exclude more of the other bids due to overlap in items), preference for bids with many items increases the number of allocations seen early. Therefore, ∝ is set about 0.8. In addition to finding the optimal solution faster via more pruning, such bid ordering improves the algorithm's anytime performance, i.e., f*, increases faster.

Next, the use of a lower bounding technique will be described for improving the speed of the BOB search method. Preferably, the BOB search method prunes using a lower bound, L, at each node. That is, if g+L>f*, then f*←g+L and IN* is updated.

Decomposition can also be utilized for improving the speed of the BOB search method. Specifically, if the set of items can be divided into subsets such that no bid includes items from more than one subset, the winner determination can be done in each subset separately. Because the search is superlinear in the size of the problem (both n and m), such decomposition leads to improved speed.

At every search node (between steps 1 and 2) the BOB search method determines whether the problem has decomposed. To this end a bid graph, G (not shown), is maintained where vertices V are the bids with $e_j$=0, and two vertices share an edge if the bids share items. Call the sets of edges E. Clearly, |E|≦n and |E|≦n(n−1)/2. Via an O(|E|+|V|) depth-first search of bid graph G, the BOB search method checks whether the bid graph G has decomposed. Every tree in the depth-first-forest corresponds to an independent subproblem (subset of bids and the associated subset of items). The winners are determined by calling the BOB search method on each subproblem. Bids not in that subproblem are marked $e_j$←1.

The straightforward approach is to call the BOB search method on each subproblem with g=0 and f*=0. However, the upper and lower bounding across subproblems, a.k.a., components, can also be utilized for improving the speed of the BOB search method. Somewhat unintuitively, further pruning can be achieved, without compromising optimality, by exploiting information across independent subproblems. Suppose there are k subproblems at the current search node θ: 1, . . . , k. Let $g^\theta$ be the g-value of θ before any of the subproblems have been solved. Let $f_q^*$ be the value of the optimal solution found for subproblem q. Let $h_q$ be the h-value of subproblem q. Let $L_q$ be a lower bound (obtained, e.g., using the greedy algorithm described above, but even $L_q$=0 works) for subproblem q.

Now, consider what to do to solve subproblem z after subproblems 1, . . . , z−1 have been solved and the other subproblems have not. Let $l_z$ be a lower bound (obtained e.g., using the greedy algorithm described above) on the value that the unallocated items of subproblem z can contribute. Let $g_z$ be the g-value within subproblem z only, and let $h_z$ be the h-value within subproblem z only. Let $$F^*_{solved} = g^\theta + \sum_{q=1}^{z-1} f_q^*$$

$$H_{unsolved} = \sum_{q=z+1}^{k} h_q$$

$$LO_{unsolved} = \sum_{q=z+1}^{k} L_q$$

At every search node within subproblem z, the global lower bound f* is updated as follows:

f*←max{f*, F*$_{solved}$+$g_z$+$l_z$+LO$_{unsolved}$} and we update IN* accordingly.

Now, cut the search path can be cut whenever

F*$_{solved}$+$g_z$+$h_z$+H$_{unsolved}$≦f*

Since both the straightforward approach and this approach are correct, we use both. If either one allows the search path to be cut, the algorithm does so in step 3.

Due to the upper and lower bounding across subproblems, the order of tackling the subproblems makes a difference in speed, providing further opportunities for optimization via subproblem ordering.

In addition to checking whether a decomposition has occurred, the BOB search method can be configured to force decomposition via articulation bids. For example, in the bid choice in step 4 above, a bid is selected that leads to a decomposition, if such a bid exists. Such bids whose deletion disconnects bid graph G and, more specifically, one portion of bid graph G from another portion thereof are called articulation bids. Articulation bids can be identified during the depth-first-search of G in O(|E|+|V|) time, as follows.

The depth-first-search assigns each node v of bid graph G a number d(v), which is the order in which nodes of G are "discovered". The root is assigned the number 0. In order to identify articulation bids, to each node v is assigned one additional number, low (v), which is defined inductively as follows:

x=min{low (w)|w is a child of v}
y=min{d(z)|(v,z) is a back edge}
low(v)=min(x,y)

A node v is an articulation bid if and only if low (v)≧d(v). If there are multiple articulation bids, a branch is made on the one that minimizes the size of the larger subproblem, measured by the number of bids.

The strategy of branching on articulation bids may conflict with price-based branching. To determine if one scheme necessarily dominants over the other, two classes of schemes are considered as follows. In an articulation-based bid choosing scheme, the next bid to branch on is an articulation bid if one exists. Ties can be resolved arbitrarily, as can cases where no articulation bid exists. In a price-based choosing scheme, the next bid to branch on is $B_k$=arg max$_{B_j \in \beta | e_j = 0}$ [($p_k$/v(|$S_k$|)], for any given positive function v. Ties can be resolved arbitrarily, e.g., preferring bids that articulate. For any given articulation-based bid choosing scheme and price-based bid choosing scheme, there are instances where the former leads to fewer search nodes, as well as instances where the latter leads to fewer search nodes.

During the search, the BOB search method could also do shallow lookaheads, for the purpose of bid ordering, to identify combinations of bids that would disconnect bid graph G.

The following methods, used at each search node, drive toward, identify and solve tractable special cases. Bids that include a small number of items lead to significantly deeper search than bids with many items because the latter exclude more of the other bids due to overlap in items. Bids with 1 or 2 items are referenced to as short and other bids long. Winners can be solved optimally in $O(n^3_{short})$ worst-case time using a weighted maximal matching algorithm if the problem has short bids only. To solve problems with both long and short bids efficiently, the algorithm described in the article by J. Edmunds, entitled "Maximum Matching and a Polyhedron with 0,1 Vertices". J. Res. Nat. Bur Standards, B (69):pp 125-130, 1965, is used with the search. The BOB search method achieves optimality without ever branching on short bids. In step 4 above, bid choice is restricted to long bids. At every node, before step 1 above, Edmond's algorithm is executed using the short bids with $e_j=0$. It returns a set of winning bids, $IN_E$, and the revenue they provide $f_E$. The only remaining change is to step 1 as follows:

Step 1: If $g+f_E>f^*$, then $IN^* \leftarrow IN \cup IN_E, f^* \leftarrow g+f_E$.

In the optimization described in the previous paragraph, short bids are statically defined. This can be improved on by a more dynamic size determination. If an item x belongs to only one long bid b, then the size of b can be effectively reduced by one. This optimization may move some of the long bids into the short category, thereby further reducing search tree size. This optimization can be done at each search node, by keeping track of bids concerning each item.

In an article by Rothkopf et al., entitled "Computationally Manageable Combinatorial Auctions", Management Science, 44(8):pp 1131-1147, 1998, a special case is considered where the items can be linearly ordered, and each bid concerns a contiguous interval of items. Specifically, assume that items are labeled {1, 2, . . . , m}, and each bid b is for some interval [i, j] of items. Using dynamic programming, Rothkopf et al. solved the problem in $O(m^2)$ time. However, as will be discussed next, this problem can be solved in optimal time $O(n+m)$.

Given a bid b on the interval [f, l], where item f is the first item of b, and item l is the last item of b, the bids are sorted in increasing order of their last item. If two bids have the same last item, the one with the smaller first item comes earlier in the sorted order. Since the set of items has bounded size [l, m], the bids can be bucket sorted in $O(n+m)$ time which enables optimal solutions for the prefix intervals of the form [1,i] to be determined, for i=1, 2, . . . , n.

Next, let opt(i) denote the optimal solution for the problem considering only those bids that contain items in the range [1, i]; that is, bids whose last item is no later than i. Initially, opt(0)=0. Let $C_i$ denote the set of bids whose last item is i. Now, $$opt(i) = \max_{b \in C_i}\{p_b + opt(f_b - 1), opt(i - 1)\},$$

where $p_b$ is the price of bid b, and $f_b$ is the smallest indexed item in b. The maximization has two terms. The first term corresponds to accepting bid b, in which case an optimal solution for the subproblem $[1, f_b-1]$ is needed. The second term corresponds to not accepting b, in which case the optimal allocation for items in $[1, f_b-1]$ is used. By solving these problems in increasing order of i, opt (i) can be determined in time proportional to the size of $C_i$. Thus, the total time complexity of $O(n+m)$ and the optimal allocation is opt(m). If all n bids are interval bids in a linearly ordered set of items [1, m], then an optimal allocation can be computed in worst-case time $O(n+m)$.

If interval wrap-around bids (e.g, $S_j-\{m-1, m, 1, 2, 3\}$) are permitted, the winners can be determined optimally in $O(m(n+m))$ time by cutting the circle of items in each of the m possible positions and solving the problem using the method described above.

It is desirable to not to limit the auctions to interval bids only, but rather to recognize whether the remaining problem at any search node falls under this special case and to solve those problems. This requires checking whether there exists some linear ordering of items for which the given set of bids are all interval bids. It turns out this problem can be phrased as the interval graph recognition problem, for which a linear-time solution exists.

Specifically, given, a bid graph G (not shown)=(V, E), bid graph G is an interval graph if the vertices V can be put in one-to-one correspondence with intervals of the real line such that two intervals overlap if and only if there is an edge between the vertices corresponding to those intervals. The interval graph recognition problem is to decide whether bid graph G is an interval graph, and to also construct the intervals. The method disclosed in an article by Korte et al., entitled "An Incremented Linear-Time Algorithm for Recognizing Interval Graphs", SIAM Journal of Computing, 18(1): 68-81, February 1989, solves this in $O(|E|+|V|)$ time. Given the intervals for the bids, a linear ordering of items can be produced as shown in FIG. 13.

Figure 13:
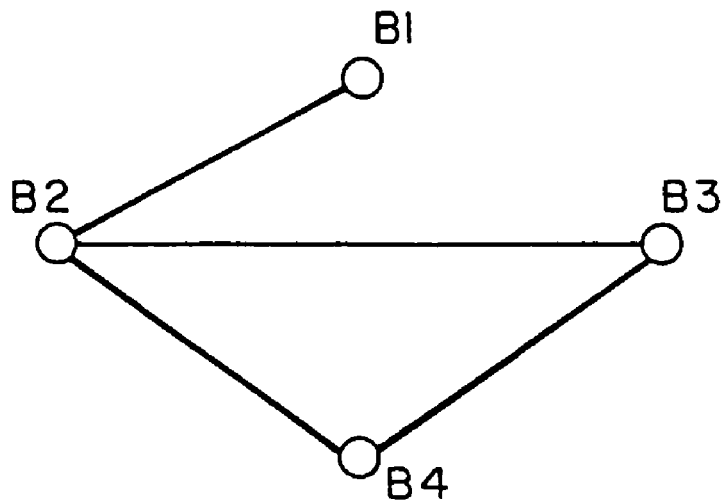
FIG. 13 shows an exemplary bid graph with valid linear ordering for the items of bids B1-B4.
Figure 13:
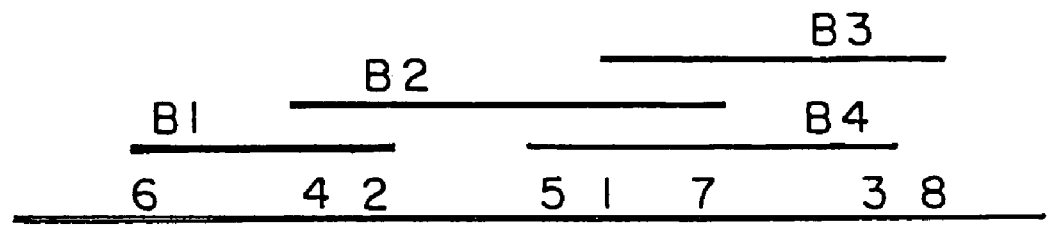

By repeating the construction shown in FIG. 13, n times, once with each bid removed, it can also be determined if bid graph G is an interval graph with wraparound.

Figure 14:
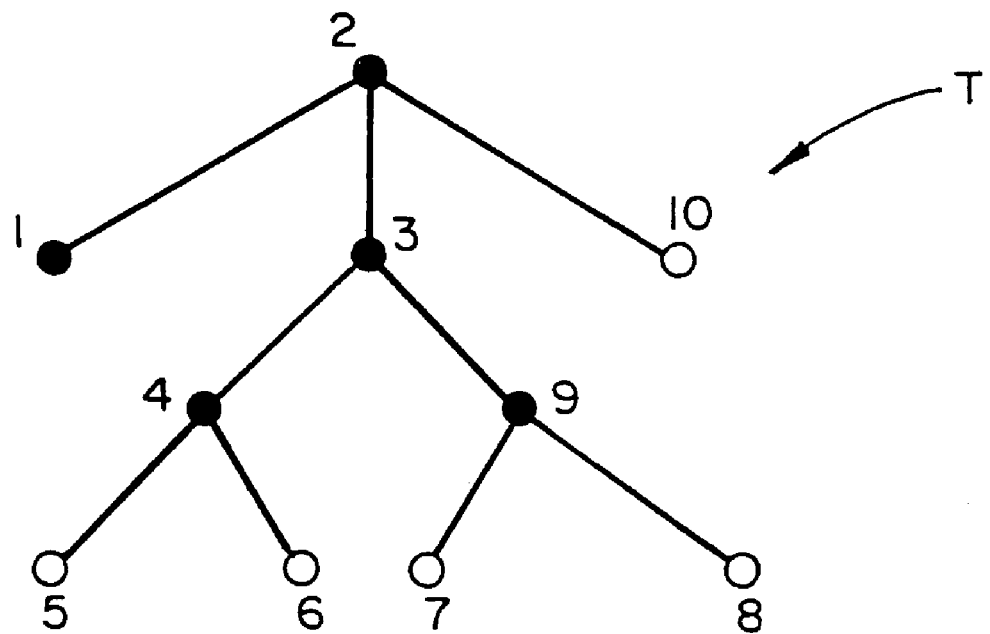
FIG. 14 is an exemplary subtree bid for a subset of the items on a tree structure.

Next, a method is described for another case that subsumes and substantially generalizes the interval bid model disclosed in the Rothkopf et al. article discussed above. In this method, the items are structured in a tree T, shown in FIG. 14, and a valid bid corresponds to a connected subgraph of tree T. This is a strict generalization of the linear ordering model, which corresponds to the special case where tree T is a path. The tree model is also distinct from the "nested structure" model disclosed in the Rothkopf et al. article discussed above, where the tree nodes correspond to those combinations of items on which bids can be submitted.

In this method, an arbitrary node r is selected as the root of tree T. Each node of tree T is assigned a level, which is its distance from the root of tree T. The level of a bid b, denoted by level(b), is the smallest level of any item in b. The bids are then sorted in increasing order of level, breaking ties arbitrarily. The optimal solutions at the nodes of tree T are determined in decreasing order of level.

Specifically, given a node i of tree T, let $C_i$ denote the set of bids that include i and whose level is the same as the level of i. The function opt(i) is determined for each node i, where opt(i) is the optimal solution for the problem considering only those bids that contain items in the subtree below i.

More specifically, consider a bid b, and suppose that the item giving b its level is x. Removing all items of b disconnects the tree T rooted at x, namely tree $T_x$, into several subtrees. Let $U_b$ be the set of roots of this forest of subtrees. Now, $$opt(i) = \max\left\{\max_{b \in C_i}\left\{p_b + \sum_{j \in U_b} opt(j)\right\}, \sum_{j \in children(i)} opt(j)\right\}$$

where $p_b$ is the price of bid b. By proceeding bottom up, opt(i) can be determined for all nodes of tree T. The recurrence above correctly computes the optimal solution for subtree bids in tree-structured items in O (nm) worst-case time. The special case of subtree bids on tree-structured item is sharp in the sense that a slight generalization makes the problem intractable. If the set of items is structured as a directed acyclic graph D, each bid is a subtree of D, then winner determination is NP-complete.

Next, a bid graph representation, where an adjacency list representation of the bid graph G (not shown) is used for efficient insert and delete operations on bids, will be described. Exclusion counts $e_j$ are not tracked. Instead, a bid j having been deleted corresponds to $e_j>0$, and a bid j not having been deleted corresponds to $e_j=0$. In this method an array is used to store the nodes of G. The array entry for node j points to a doubly-linked list of bids that share items with j. Thus, an edge (i, k) creates two entries: one for j in the list of k, and the other for k in the list of j. Cross-pointers are used with these entries to be able to access one from the other in O(1) time. To delete node j whose current neighbor list is $\{b_1, b_2, \ldots, b_k\}$, the node j is marked "deleted" in the node array. Then, the linked list of j is used to access the position of j in each of the $b_i$'s list, and that entry is deleted, at O(1) cost each. When reinserting a node j with edges $E_j$ into bid graph G, node j's "deleted" label is first removed in the node array. Then, for each $(j, k) \in Ej$, j is inserted at the front of k's neighbor list, k is inserted at the front of j's neighbor list, and the cross-pointer is set between them, all at O(1) cost.

As the BOB search method branches by $x_j=1$, j and its neighbors in bid graph G are deleted. Also stored in the search node is a list of the edges that were removed: the edges E' that include j, and the edges E" that include j's neighbors but not j. When backtracking to that node, j's neighbors are reinserted into bid graph G using the edges E". Then the BOB search method branches by $x_j=0$. When backtracking from that branch, j is reinserted into bid graph G using edges E'.

Next, a method of maintaining a heuristic function is described that has data structures that enable h to be determined quickly and exactly. In this method, the items in a dynamic list which supports insert and delete in O(log m) time each are stored. Each item i points to a heap H(i) that maintains the bids that include i. The heap supports find-max, extract-max, insert, and delete in O(log m) time each (delete requires a pointer to the item being deleted, which is maintained).

A heuristic function requires computation, for each item i, of the maximum value $p_j/|S_j|$ among the bids that have not been deleted and concern item i, where $p_j$ is price and $|S_j|$ is the number of items in the bid. A tally of the current heuristic function is stored and updated each time a bid gets deleted or reinserted into bid graph G. For example, consider the deletion of bid j that has k items, where each item points to its position in the item list. In this example, j's entry is deleted from the heap of each of these k items. For each of these k items, the heuristic function is updated by calculating the difference in its c value before and after the update. When j is reinserted, it is inserted into the heaps of all the items that concern j. The cost, per search node, of updating the heuristic function is $\Sigma_j |S_j| \log m$, where the summation is over all the bids that were deleted or reinserted.

As a further optimization, a leftist heap for H(i) is utilized. Details regarding the leftist heap for H(i) can be found in the publication by Weiss, Mark Allen, entitled "Data Structures and Algorithm Analyses in C++." Addison-Wesley, 2nd edition, 1999. A leftist heap has the same worst-case performance as an ordinary heap, but improves the amortized complexity of insert and delete to O(1), while extract-max and find-max remain O(log m). Because the insert and delete operations in the BOB search method are quite frequent, this improves the overall performance.

In some auctions, there are multiple indistinguishable units of each item for sale. In such auctions, the bids can be compressed to speed up winner determination by not treating every unit as a separate item, since the bidders do not care which units of each item they get, only how many. A bid in this setting is defined as $B_j = \langle (\lambda^1_j, \lambda^2_j, \ldots, \lambda^m_j), p_j \rangle$, where $\lambda^k_j$ is the requested number of units of item k, and $p_j$ is the price. The winner determination problem can be expressed as:

$$\max \sum_{j=1}^{n} p_j x_j \text{ s.t.} \sum_{j=1}^{n} \lambda^i_j x_j \le u_i \qquad i = 1, 2, \ldots, m$$
$$x_j \in \{0,1\}$$

where $u_i$ is the number of units of item i for sale. Where free disposal is not possible, the inequality constraint is changed to an equality constraint.

The winner determination method that branches on items cannot be used in this setting. However, the BOB search method can be used. In the BOB search method, a tally $$\Lambda_i = \sum_{j | x_j = 1} \lambda^i_j$$

is kept. Once $\Lambda_i > u_i$ for some item i, that branch is cut.

One suitable heuristic for this setting is:

$$h = \sum_{i \in M} \left[ (u_i - \Lambda_i) \max_{j \in V_G | \lambda^i_j > 0} p_j \Big/ \sum_{i \in M} \lambda^i_j \right]$$

where $V_G$ is the set of bids that remain in graph G. More refined heuristics can be constructed by giving different items different weights. The lower bounding technique described above can also be used.

Bid ordering can be used, e.g., by presorting the bids in descending order of $p_j$ $$p_j \Big/ \left( \sum_{i=1}^{n} \lambda^i_j \right)^\infty.$$

The decomposition techniques described above can be utilized on the bid graph G (not shown) where two vertices, j and k, share an edge if $\exists i$ s.t. $\lambda^i_j > 0$ and $\lambda^i_k > 0$. The bid graph G representation and the maintenance of a heuristic function described above apply with the addition that also bids with $\lambda^k_j > u_k - \Lambda^k_j$ are deleted when branching and reinserted when backtracking.

In a combinatorial exchange, both buyers and sellers can submit combinatorial bids. Bids are like those in the multi-unit case, except that $\lambda^i_j$ values can be negative, as can the price $p_j$, representing selling instead of buying. Winner determination in a combinatorial exchange to maximize surplus can be expressed as follows.

$$\max \sum_{j=1}^{n} p_j x_j \text{ s.t. } \sum_{j=1}^{n} \lambda_j^i x_j \leq 0 \qquad i = 1, 2, \ldots, m$$
$$x_j \in \{0, 1\}$$

If the exchange changes based on transaction volume, as most current exchanges do, it may be desirable to maximize volume instead: $\max \Sigma_{j \in \{1, \ldots, n\} | p_j > 0} p_j x_j$ with the same constraints. The methods described herein apply to this case as they do to surplus maximization. However, surplus maximization is more desirable since it maximizes social welfare (assuming that bidders are truthful).

Unlike earlier algorithms that branch on items, the BOB search method, which branches on bids, can be used in combinatorial exchanges. Bid ordering can be used, e.g., by branching on a bid that minimizes $$\sum_{i | \Lambda_i > 0} \Lambda_i + \lambda_j^i,$$

or a bid that maximizes $p_j$.

The decomposition techniques described above apply on graph G where two vertices, j and k, share an edge if ∃ item i such that $\lambda_j^i \neq 0$ and $\lambda_k^i \neq 0$. However, once a bid is assigned winning and removed from graph G, the neighbor bids in graph G cannot always be removed unlike in the basic combinatorial auction. Instead, only those neighbors j, are removed that cannot possibly be matched anymore:

$$\exists \text{ item } i \; s \cdot t \cdot \lambda_j^i > 0 \text{ and } \lambda_j^i + \Lambda i + \sum_{k \in V_G | \lambda_k^i < 0} \lambda_k^i > 0, \text{ or}$$

$$\exists \text{ item } i \; s \cdot t \cdot \lambda_j^i > 0 \text{ and } \lambda_j^i + \Lambda i + \sum_{k \in V_G | \lambda_k^i > 0} \lambda_k^i < 0,$$

where $V_G$ is the set of remaining bids in G. The removed bids are reinserted into G when backtracking. The data structure improvements described above in connection with bid graph G representation and the maintenance of a heuristic function apply with this modification.

The upper bounding and lower bounding techniques discussed above can be utilized after forming algorithms that compute an upper bound h and a lower bound L. Then also, the upper bounding and lower bounding techniques across subproblems apply.

Bid ordering can also be used. For example, by branching on a bid j that maximizes $p_j$ (the bids can be sorted in this order as a preprocessing step to avoid sorting during search), the BOB search method can strive to high-surplus allocations early, leading to enhanced pruning. As another example, by branching on a bid j that minimizes $$\sum_{j | \Lambda_i > 0} \Lambda_i + \lambda_i^j,$$

or a bid that minimizes $\max_{j | \Lambda_i > 0} \Lambda_i + \lambda_i^j$, the algorithm can reach feasible solutions faster (especially in the case of free disposal), leading again to enhanced pruning from then on.

Additional pruning is achieved by branching on bids with $p_j < 0$ first, and then on bids with $p_j \geq 0$. Alternatively, one can branch on bids with $p_j > 0$ first, and reverse all of the techniques discussed herein. Once $$\sum_{j | x_j = 1} p_j > 0,$$

that branch of the search is pruned. Alternatively, one can do this ordering ($\lambda_j^i < 0$ vs. $\lambda_j^i \geq 0$) and pruning (when $\Lambda_i > 0$) on any i instead of price. Also, after the switch to bids with $p_j \geq 0$ has occurred on a path, h, the lower bounding technique and bid ordering technique discussed above can be used among these bids to achieve further pruning.

The decomposition techniques discussed above can also be utilized on the bid graph G (not shown) where two vertices, j and k, share an edge if ∃ i s.t. $\lambda_j^i \neq 0$ and $\lambda_k^i \neq 0$. Bid graph representation and maintenance of the heuristic function, described above, can also be used.

In some auctions, the seller has a reserve price $r_i$ for every item i, below which she is not willing to sell. In accordance with the present invention, a reserve price can be considered by adding the constraint that the revenue collected from the bids is no less than the sum of the reserve prices of the items that are allocated to bidders. However, it is more sensible for the auctioneer to instead change the maximization criterion to max:

$$\sum_{j=1}^{n} \left( p_j - \sum_{i \in S_j} r_i \right) x_j.$$

More specifically, the item's reserve prices are simply subtracted from the bid prices as a preprocessing step. This can also be used for exchanges where only one side (buyers or sellers) is allowed to place combinatorial bids. The bids of the other side are considered reserve prices, allowing the use of the method of winner determination for one-to-many auctions to be used in many-to-many exchanges.

Auctions where the seller is allowed to submit reserve prices on combinations of items or is allowed to express substitutabilities in the reserve prices, are treated as exchanges where the seller's reserve prices are her bids. Accordingly, the algorithm described in connection with winner determination in a combinatorial exchange, discussed above, can then be used.

In the auctions discussed thus far, bidders can express superadditive preferences. That is, bidders can express preferences where the value of a combination is greater or equal to the sum of the values of its parts. They cannot, however, express subadditive preferences, a.k.a. substitutability. For example, by bidding $5.00 for items {1,2}, $3.00 for item {1}, and $4.00 for item {2}, the bidder may get items {1,2} for $7.00. To avoid this problem, bidders can combine their bids with "XOR" constraints potentially joined by "OR" constraints. The "OR" constraints uses dummy items. Thus, if two bids share a dummy item, they cannot be in the same allocation.

The BOB search method can be used with the "XOR" constraints by adding edges in bid graph G (not shown) for every pair of bids that is combined with "XOR". These additional constraints actually speed up the search. However, only some of the optimizations apply, e.g., bid ordering heuristics, lower bounding techniques, decomposition techniques, forced decomposition, bid graph representations, and maintenance of the heuristic function. The BOB search method supports joining "XOR" constraints with "OR" constraints directly and all of the optimizations apply.

Lastly, the preprocessing techniques discussed above in connection with FIGS. 7 and 8 can be used in conjunction with the BOB search method.

Linear programming techniques that prioritize search decisions based on bids, not items, can also be utilized to determine upper bounds of groups of bids, or components, in a search tree. More specifically, a linear program represented as a matrix can be created, with each row of the matrix including a constant and a variable for each received bid, wherein relationships between the received bids are expressed mathematically. This matrix can then be solved utilizing conventional matrix algebraic techniques to determine upper bounds. More specifically, linear program relaxation of integer and non-integer variables in the matrix of equations can occur in order to facilitate determination of upper bounds. The underlying steps of this linear program relaxation technique will now be described in sufficient detail to enable one skilled in the art of combinatorial forward auctions, reverse auctions, and/or exchanges to make and use the invention. The following described method will generally be referred to as combinatorial auction branch on bid (CABOB) search method to distinguish it from the BOB search method described above.

Suppose an auctioneer has a set of items, $M=\{1, 2, \ldots, m\}$, to sell, and buyers submit a set of bids, $B=\{B_1, B_2, \ldots, B_n\}$. A bid is a tuple $B_j=\langle S_j, p_j \rangle$, where $S_j \subset M$ is a set of items and $p_j \geq 0$, is a price. The binary combinatorial auction winner determination problem is to label the bids as winning or losing so as to maximize the auctioneer's revenue under the constraint that each item can be allocated to at most one bidder.

If bids could be accepted partially, winner determination can be solved utilizing a linear program (LP) algorithm to form a linear program matrix or table. The LP algorithm and its DUAL algorithm, which also forms a linear program matrix or table, have the following general form.

| LP | DUAL |
|---|---|
| $\max \sum_{j=1}^{n} p_j x_j$ | $\min \sum_{i=1}^{m} y_i$ |
| $\sum_{j \mid i \in S_j} x_j \leq 1, i \in \{1 \ldots m\}$ | $\sum_{i \in S_j} y_i \geq p_j, j \in \{1 \ldots n\}$ |
| $x_j \in$ real numbers | $y_i \in$ real numbers |

The foregoing LP and DUAL express relaxation of algorithms that may be constrained to accept or reject one or more bids completely.

In the foregoing LP and DUAL, a shadow price $y_i$ gives the price for each individual item i. If there are some items that are not included in any bids, the constraint $y_i \geq 0$ is added to the DUAL for those items. Desirably, such items are removed as a preprocessing step. In a binary case, individual items cannot generally be given prices, but each $y_i$ value from DUAL gives an upper bound on the price of item i.

The CABOB search method utilizes a tree search algorithm that branches on bids like the BOB search method described above. However, the CABOB search method includes additional techniques.

The skeleton of the CABOB search method is a depth-first branch-and-bound tree search that branches on bids. The value of the best solution found so far is stored in a global variable f*. Initially, f*=0.

A conflict graph structure, or bid graph, G is maintained. The nodes of graph G correspond to bids that are still available to be appended to a search path, that is, bids that do not include any items that have already been allocated. The number of vertices |V| in graph G is less than or equal to the number of items n. Two vertices |V| in graph G share an edge when the corresponding bids share items.

The following CABOB search method makes calls to several special cases which will be introduced later. For readability, it is only shown how the values are updated.

A technique for pruning across independent subproblems or components of G i.e., subsets of bids is discussed hereinafter. To support this, a parameter, MIN, is used to denote the minimum revenue that the call to the CABOB search method must return (not including the revenue from the path so far or from neighbor components) to be competitive with the best solution found so far. The revenue g from the bids that are winning on the search path so far includes the lower bounds (or actual values) of neighbor components of each search node on the path so far.

The search is invoked by calling from a main calling routine the CABOB search method, for CABOB (G, 0, 0), which includes the following steps:

1. Apply special cases COMPLETE and NO_EDGES (discussed hereinafter;
2. Run depth-first-search (DFS) on G to identify the connected components of G; let c be number of components found, and let $G_1, G_2, \ldots, G_c$ be c independent bid graphs;
3. Calculate an upper bound $U_i$ for each component i;

4. If $\sum_{i=1}^{c} U_i \leq$ MIN, then return 0;

5. Apply special case INTEGER (discussed hereinafter);
6. Calculate a lower bound $L_i$ for each component i;

7. $\Delta \leftarrow g + \sum_{i=1}^{c} L_i - f^*$;

8. If $\Delta > 0$, then
   $f^* \leftarrow f^* + \Delta$
   MIN $\leftarrow$ MIN + $\Delta$;
9. If c>1 then go to step (11), below,
10. Choose next bid $B_k$ to branch on (use articulating bids first if any):
    10.a. $G \leftarrow G - \{B_k\}$;
    10.b. Apply special case ALL_NEIGHBORS (discussed hereinafter;
    10.c. For all $B_j$ such that $B_j \neq B_k$ and $S_j \cap S_k \neq 0$, $G \leftarrow G - \{B_j\}$;
    10.d. $f_{old}^* \leftarrow f^*$;
    10.e. $f_{in} \leftarrow$ CABOB(G, g+$p_k$, MIN-$p_k$);
    10.f. MIN $\leftarrow$ MIN+(f*-$f_{old}^*$);
    10.g. For all $B_j$ such that $B_j \neq B_k$ and $S_j \cap S_k \neq 0$, $G \leftarrow G \cup \{B_j\}$;
    10.h. $f_{old}^* \leftarrow f^*$;

10.i. $f_{out} \leftarrow$ CABOB(G, g, MIN);
10.j. MIN$\leftarrow$MIN+($f^* - f_{old}^*$);
10.k. $G \leftarrow G \cup \{B_k\}$;
10.l. Return max$\{f_{in}, f_{out}\}$;
11. $F_{solved}^* \leftarrow 0$;

12. $H_{unsolved} \leftarrow \sum_{i=1}^{c} U_i$, $L_{unsolved} \leftarrow \sum_{i=1}^{c} L_i$;

13. For each component $i \in \{1, \ldots, c\}$ do;
    13.a. If $F_{solved}^* + H_{unsolved} \leqq$ MIN, return 0;
    13.b. $g_i' \leftarrow F_{solved}^* + (L_{unsolved} - L_i)$;
    13.c. $f_{old}^* \leftarrow f^*$;
    13.d. $f_i^* \leftarrow$ CABOB($G_i$, $g + g_i'$ MIN-$g_i'$);
    13.e. MIN$\leftarrow$MIN+($f^* - f_{old}^*$);
    13.f. $F_{solved}^* \leftarrow F_{solved}^* + f_i^*$;
    13.g. $H_{unsolved} \leftarrow H_{unsolved} - U_i$;
    13.h. $L_{unsolved} \leftarrow L_{unsolved} - L_i$;
and
14. Return $F_{solved}^*$;

The techniques of the CABOB search method will now be described in greater detail.

In step (3), the CABOB search method uses an upper bound on the revenue the unallocated items can contribute. If the value of the current solution cannot be improved when the upper bound is met, the CABOB search method prunes the search path.

Any technique for devising an upper bound could be used here. The remaining LP, whose objective function value gives an upper bound, can then be solved.

When determining an upper bound, the CABOB search method does not make copies of the LP table, but, rather, incrementally deletes and reinserts columns corresponding to the bids being deleted and reinserted in G as the search proceeds down a path and backtracks, respectively. Also, as the CABOB search method moves down a search path, it remembers the LP solution from the parent node and uses it as a starting solution for the child's LP.

For example, when determining an upper bound, a first linear program matrix formed in accordance with the LP algorithm discussed above is formed for a first group of bids of a subtree of a search tree. Each column of the first matrix represents one of the bids of the first group of bids, the intersection of each row and each column includes a variable and a quantity of the corresponding item in the corresponding bid, and the sum of the quantities in each row equals the total quantity of the corresponding item available in a forward auction, the total quantity of the corresponding item required in a reverse auction, or zero (0) in an exchange. An objective is defined for the first matrix. This objective can be to maximize the cost of items sold in a forward auction, minimize the cost of items purchased in a reverse auction or maximize a difference between the cost of items sold and the cost of items purchased in an exchange.

Each requirement that a solution of the first matrix cause at least one variable thereof to have an integer value is relaxed whereupon the at least one variable can have any numeric value. The first matrix is then solved utilizing conventional matrix algebra techniques to achieve the objective thereby determining values for the variables. The upper bound price of the first group of bids can then be determined as a function of the thus determined values of the variables of the first matrix.

A second group of bids that is the subset of the first group of bids can then be identified. A second linear program matrix can be formed for the second group of bids. Each column of the second matrix represents one of the bids of the second group of bids. The intersection of each row and each column includes a variable and a quantity of the corresponding item in the corresponding bid. The sum of the quantities in each row equals the total quantity of the corresponding item available in a forward auction, the total quantity of the corresponding item required in a reverse auction, or zero (0) in an exchange.

Each requirement that a solution of the second matrix cause at least one variable thereof to have an integer value is relaxed whereupon the at least one variable can take on any numeric value. The value of the variable at the intersection of each row and column of the second matrix is assigned the value of the variable determined at the intersection of the corresponding row and column of the first matrix. More specifically, the value of the variable represented by the bid-item pair at the intersection of each row and column of the second matrix is assigned the value at the intersection of the row and column of the first matrix for the same bid-item pair. The upper bound price of the second group of bids is then determined as the function of the substituted values of the variables in the second matrix.

In this manner, once the LP solution of a parent node has been determined using the first group of bids, the LP solution for a child node can be more efficiently determined using the second group of bids.

It is not always necessary to solve the LP table to optimality. Before starting the solution of the LP table, the condition in step (4) of the CABOB search method can be evaluated to determine the minimum revenue MIN the LP has to produce so that the search branch would not be pruned. Once an LP solution is found that exceeds the MIN threshold, processing of the LP can be stopped without pruning the search branch. If the LP solution does not exceed the MIN threshold and runs to completion, the branch could be pruned. Desirably, the CABOB search method always runs the LP to completion because the CABOB search method uses the solutions (integer and real numbers) from the LP and the DUAL for several other purposes beyond upper bounding (such as for bid ordering and for random restart methods discussed hereinafter.)

If the solution of the LP returns integer values ($x_j=0$ or $x_j=1$) for each bid j in the LP Table, the CABOB search method makes the bids with $x_j=1$ winning, and those with $x_j=0$ losing. This is clearly an optimal solution for the remaining bids. The CABOB search method then updates f* if the solution is better than the best so far. The CABOB search method then returns from the call without searching further under that node.

If some of the $x_j$ values are not integer, bids with $x_j=1$ cannot simply be accepted. Neither can bids with $x_j=0$ be rejected. Either approach can compromise optimality.

In step (6), the CABOB search method calculates a lower bound on the revenue that the remaining items can contribute. If the lower bound is high, it can allow f* to be updated, leading to more pruning and less search in the subtree rooted at that node.

Any lower bounding technique could be used. One exemplary lower bounding technique includes the following rounding technique. In step (3), the CABOB search method solves the remaining LP, which gives an "acceptance level" $x_j \in [0,1]$ for every remaining bid $B_j$. All bids with $x_j > 0.5$ are inserted into the lower bound solution. The remaining bids, i.e., bids with $x_j \leqq 0.5$, are then inserted into the lower bound solution in decreasing order of $x_j$, skipping bids that share items with bids already in the lower bound solution. Note that inserting a bid into the lower bound solution does not mean inserting the bid into the search path. Also, it does not mean that the bid is removed from G.

This rounding technique gives a lower bound because the solution it obtains is feasible. If an item is contained in more than one bid, at most one of those bids can have $x_j>0.5$ in the LP, so at most one of those bids will be inserted into the lower bound solution when solving the LP. When using the rounding technique described above, feasibility is maintained by only considering for insertion in the lower bound bids that do not share items with bids already in the lower bound solution.

In step (2), the CABOB search method runs a depth-first-search (DFS) in bid graph G. Each tree in the depth-first forest, i.e., subset of connected bids in graph G, is a connected component of graph G. Winner determination is then conducted in each component independently. Since search time is related to the size of graph G, this decomposition of graph G into components leads to a time savings. The winners are determined by calling the CABOB search method on each component separately.

Upper and lower bounding techniques are common in tree search algorithms, and the CABOB search method uses upper and lower bounding as discussed above. However, in addition to common upper and lower bounding methods, further pruning can be achieved, without compromising optimality, by exploiting information across independent components. Specifically, when starting to solve a component, the CABOB search method determines how much the component would have to contribute to revenue in the context of what is already known about bids on the search path so far and the neighboring components. More specifically, when determining the MIN value for calling the CABOB search method on a component, the revenue that the current call to the CABOB search method has to produce (the current MIN value), is decremented by the revenues from solved neighbor components and the lower bounds from unsolved neighbor components. The use of a MIN value allows the CABOB search method to work correctly even though on a single search path there may be several search nodes where decomposition occurred, interleaved with search nodes where decomposition did not occur.

Every time a better solution is found and f* is updated, all MIN values in the search tree are incremented by the amount of the improvement since now the bar of when search is useful has been raised. This causes the MIN values to stay nonnegative throughout the tree. The CABOB search method handles these updates without separately traversing the tree when an update occurs. The CABOB search method directly updates MIN in step (8), and updates the MIN value of any parent node after a recursive call to the CABOB search method returns.

The CABOB search method also uses lower bounding across components. At any search node, the lower bound includes the revenues from the bids that are winning on the path, the revenues from the solved neighbor components of search nodes on the path, the lower bounds of the unsolved neighbor components of search nodes on the path, and the lower bound on the revenue that the unallocated items in the current search node can contribute.

In addition to checking whether a decomposition has occurred, the CABOB search method also strives for decomposition. In the bid choice in step (10), the CABOB search method picks a bid that leads to a decomposition, if such a bid exists. Such bids whose deletion disconnects graph G are called articulation bids.

The technique of always branching on an articulation bid, if one exists, is often at odds with price-based bid ordering techniques, discussed hereinafter. It has been observed that no technique from the articulation-based family dominates any technique from the price-based family, or vice versa. In general, however, it is almost always more efficient to branch on articulation bids if they exist because decomposition reduces search drastically.

Even if a bid is not an articulation bid, and would not lead to a decomposition if the bid is assigned losing, i.e., not included in the winning allocation, it might lead to a decomposition if it is assigned winning because that removes the bid's neighbors from G as well. This is yet another reason to assign a bid that is branched on to be winning, i.e., in the winning allocation, before assigning it to be losing (value ordering). Also, in bid ordering (variable ordering), preference can first be given to articulation bids, then to bids that articulate on the winning branch only, and, lastly, to bids that do not articulate on either branch (among them, price-based bid ordering could be used). An attempt can be made to identify sets of bids that articulate the bid graph, and branch on all of the bids in the set. However, the CABOB search method simply gives first priority to articulation bids and, if there are none, uses other bid ordering techniques, discussed hereinafter. If there are several articulation bids, the CABOB search method branches on the one that is found first (the others will be found at subsequent levels of the search). More elaborate techniques can also be used for choosing among articulation bids.

The COMPLETE special case will now be described. In step (1), the CABOB search method checks whether graph G is complete: $|E|=|n(n-1)/2|$. If so, only one of the remaining bids can be accepted. The CABOB search method picks the bid with highest price, updates f* if appropriate, and prunes the search path.

The NO_EDGES special case will now be described. In step (1), the CABOB search method checks whether graph G has any edges ($|E|>0$). If not, it accepts all of the remaining bids, updates f* if appropriate, and prunes the search path.

The ALL_NEIGHBORS special case will now be described. In step (10.b), the CABOB search method checks whether the bid to branch on, $B_k$, neighbors all other bids in graph G. If so, none of the other bids can be accepted. Therefore, the CABOB search method never actually proceeds to the branch where $B_k$ is accepted, but simply tries to include $B_k$, and updates f* if appropriate. The CABOB search method then proceeds to the branch where $B_k$ is rejected. This saves the time of removing all the vertices and edges from graph G and then immediately re-inserting them.

The only preprocessing that the CABOB search method does is that as a bid $B_x$ arrives, the CABOB search method discards every bid $B_y$ that $B_x$ dominates ($p_x \geq p_y$ and $S_x \subset S_y$), and discards bid $B_x$ if it is dominated by any earlier bid.

In step (10) of the CABOB search method, there are potentially a large number of bids on which the CABOB search method could branch. Bid ordering heuristics for making this choice are now described.

Normalized Bid Price (NBP): Branch on a bid with the highest $w_j=p_j/(|S_j|)^\alpha$. It has been observed that $\alpha \in [0.8, 1]$ yields the fastest performance.

Normalized Shadow Surplus (NSS): The problem with NBP is that it treats each item as equally valuable. It could be modified to weight different items differently based on static prices that, for example, the seller guesses before the auction. However, the shadow price $y_j$ from the remaining DUAL problem can be used as a proxy for the value of an item. A branch in graph G can then occur on the bid whose price gives the highest surplus above the value of the items. (normalized by the values so the surplus has to be greater if the bid uses valuable items):

$$w_j = \left(p_j - \sum_{i \in s_j} y_i\right) \bigg/ \left(\sum_{i \in s_j} y_i\right)^\infty.$$

It has been observed that the following modification to the normalization leads to faster performance:

$$w_j = \left(p_j - \sum_{i \in s_j} y_i\right) \bigg/ \log\left(\sum_{i \in s_j} y_i\right).$$

The latter normalization is referred to as NSS.

Bid Graph Neighbors (BGN): Branch on a bid with the largest number of neighbors in graph G. The motivation is that this will allow the CABOB search method to exclude the largest number of still eligible bids from consideration.

Number of Items (NI): Branch on a bid with the largest number of items. The motivation is the same as in BGN.

One Bids (OB): Branch on a bid whose $x_j$-value from the LP is closest to 1. The idea is that the more of the that bid is accepted in the LP, the more likely it is to be competitive.

Fractional Bids (FB): Branch on a bid with $x_j$ closest to 0.5. The idea is that the LP is least sure about these bids, so it makes sense to resolve that uncertainty rather than to invest branching on bids about which the LP is "more certain". More often than not, the bids whose $x_j$ values are close to 0 or 1 tend to get closer to those extreme values as the search proceeds down a search path in graph G, and in the end, the LP will give an integer solution. Therefore, those bids never end up being branched on.

It has been observed that on certain distributions, OB+NSS works best while on distributions where the bids included a large number of items, NSS alone works best. The selective superiority of the heuristics enables bid ordering heuristic to be selected dynamically based on distributing characteristics of the remaining subproblem. One exemplary distinguishing characteristic includes LP density which is defined as follows:

$$LP\ density = \frac{number\ of\ nonzero\ coefficients\ in\ the\ LP}{(number\ of\ LP\ rows)(number\ of\ LP\ columns)}$$

OB+NSS works best when density is less than 0.25 and NSS was best otherwise. When the LP table is sparse, LP is good at "guessing" which bids to accept. When the table is dense, the LP makes poor guesses (most bids are accepted to a small extent). In those cases, the price-based scheme NSS (that still uses the shadow prices from the LP) works better.

So, at every search node in the CABOB search method, the density is computed, and the bid ordering scheme is chosen dynamically (OB+NSS if density is less than 0.25, NSS otherwise).

As a fundamentally different bid ordering methodology, it has been observed that stochastic local search—or any other approximate algorithm for the winner determination problem—could be used to come up with a good solution fast, and then that solution could be forced to be the IN-branch of the CABOB search method's search tree. Committing (as an initial guess) to the entire set of accepted bids from the approximate solution in this way would give the CABOB search method a more global form of guidance in bid ordering than conducting bid ordering on a per-bid basis.

The invention has been described with reference to the preferred embodiments. Obvious modifications and alterations will occur to others upon reading and understanding the preceding detailed description. It is intended that the invention be construed as including all such modifications and alterations insofar as they come within the scope of appended claims or the equivalents thereof.

The invention is claimed to be:

1. A computer-implemented method for determining winning bid(s) in a combinatorial auction or exchange comprising:
    (a) storing bids in a memory of a computer, wherein each bid includes one or more items and a bid price associated with said one or more items;
    (b) directing a processor of the computer to choose one of the received bids;
    (c) directing the processor to select bids from the received bids as a function of the bid chosen in step (b), wherein the selected bids include the chosen bid;
    (d) directing the processor to form in the memory from said selected bids at least part of a search tree that includes inclusion branches and exclusion branches and which defines for each selected bid at least one node on one level of the search tree that is connected to at least one other node on another level of the search tree by either an inclusion branch or an exclusion branch;
    (e) directing the processor to search a plurality of unique paths of the search tree to determine for each path a candidate allocation of the selected bids, wherein each candidate allocation includes a combination of the selected bids that lie along the corresponding search path and a price that is the sum of the bid prices of the combination of the selected bids; and
    (f) when the processor determines that a price of a candidate allocation is better than a current price of a best allocation stored in a memory location, updating the memory location storing the best allocation and its price with the candidate allocation and its price.

2. The method of claim 1, wherein step (e) includes:
    determining an upper bound price of a first group of bids of a subtree of the search tree;
    determining a difference between (1) a sum of the price(s) of the bid(s) that lie on a search path connected to the subtree and (2) the current price of the best allocation;
    if the upper bound price is less than or equal to said difference, excluding each branch of the subtree from the search path; and
    if the upper bound price is greater than said difference, include at least one branch of the subtree on the search path.

3. The method of claim 2, wherein determining the upper bound includes:
    (1) forming a first linear program matrix for the first group of bids wherein each column of the first matrix represents one of bids of the first group of bids, the intersection of each row and each column includes a variable and a quantity of the corresponding item in the corresponding bid, and the sum of the quantities in each row equals the total quantity of the corresponding item available in a forward auction, the total quantity of the corresponding item required in a reverse auction or zero (0) in an exchange;

(2) defining an objective for the first matrix;

(3) relaxing each requirement that a solution of the first matrix cause at least one variable thereof to have an integer value whereupon the at least one variable can have any numeric value;

(4) solving the first matrix to achieve the objective thereby determining values for the variables; and (5) determining the upper bound price of the first group of bids as a function of the thus determined values of the variables of the first matrix.

4. The method of claim 3, wherein the objective is either maximize the cost of items sold in a forward auction, minimize the cost of items purchased in reverse auction or maximize a difference between the cost of items sold and the cost of items purchased in an exchange.

5. The method of claim 3, further including, terminating the search if the at least one variable that would have an integer value had each requirement in step (3) not been relaxed has an integer value in response to the solution in step (4).

6. The method of claim 3, further including:

identifying a second group of bids that is a subset of the first group of bids;

forming a second linear program matrix for the second group of bids wherein each column of the second matrix represents one of the bids of the second group of bids, the intersection of each row and each column includes a variable and a quantity of the corresponding item in the corresponding bid, and the sum of the quantities in each row equals the total quantity of the corresponding item available in a forward auction, the total quantity of the corresponding item required in a reverse auction or zero (0) in an exchange;

relaxing each requirement that a solution of the second matrix cause at least one variable thereof to have an integer value whereupon the at least one variable can have any numeric value;

assigning to the value of the variable at the intersection of each row and column of the second matrix the value determined for the variable at the intersection of the corresponding row and column of the first matrix; and determining the upper bound price of the second group of bids as a function of the substituted values of the variables in the second matrix.

7. The method of claim 3, wherein the solution of the first matrix in step (4) progresses until the upper bound price is greater than said difference.

8. The method of claim 1, wherein, when a first selected bid has an item in common with a second selected bid, only the first selected bid or the second selected bid is included in a candidate allocation.

9. The method of claim 3, wherein, when no selected bid has an item in common with another selected bid, all of the selected bids can be included in a candidate allocation.

10. The method of claim 3, wherein, in step (b), the one received bid is chosen based on at least one of the following heuristics:

the bid having the highest normalized bid price;

the bid having a bid price with the highest surplus above the worth of the one or more items thereof;

the bid having the highest number of at least one item in common with another bid;

the bid having the largest number of items, the bid whose variable has the value closest to 1; and the bid whose variable has the value closest to 0.5.

11. The method of claim 10, wherein the at least one heuristic to be applied depends on a characteristic of the linear program matrix.

12. The method of claim 11, wherein said characteristic includes at least one of the following:

the number of columns in the first matrix;

the number of rows in the first matrix;

the number of nonzero coefficients in the first matrix; and the number of nonzero coefficients in the first matrix divided by the product of the number of columns and the number of rows in the first matrix.

13. The method of claim 1, further including:

separating the selected bids into at least one group of disjoint bids; and determining an upper bound for each group of bids.

14. The method of claim 13, further including:

(h) determining for one group of bids a value MIN that represent a minimum price the group of bids must exceed to find a candidate allocation that has a price better than the current price of the best allocation;

(i) if the upper bound for the group of bids is less than MIN for the group of bids, terminating searching the group of bids, otherwise defining from the group of bids a first subgroup of bids;

(j) choosing one of the bids of the first subgroup of bids;

(k) selecting bids from the first subgroup of bids as a function of the bid chosen in step (j), wherein the bids selected from the first subgroup of bids include the bid chosen in step (j);

(l) forming from the bids selected in step (k) at least part of another search tree that defines for each bid selected in step (k) at least one node on one level of the search tree that is connected to at least one other node on another level of the search tree by at least one of an inclusion branch and an exclusion branch;

(m) searching a plurality of unique paths of the other search tree to determine for each path a candidate allocation of the selected bids, wherein each candidate allocation includes a combination of the selected bids that lie along the corresponding search path and a price that is the sum of the bid prices of the combination of the selected bids; and (n) when a price of a candidate allocation in step (m) is better than the current price of the best allocation, updating the best allocation and its price with the candidate allocation and its price.

15. A computer readable medium having stored thereon instructions which, when executed by a processor, cause the processor to perform the steps of:

(a) store bids in a memory of a computer, wherein each bid includes one or more items and a bid price associated with said one or more items;

(b) choose one of the received bids;

(c) select bids from the received bids as a function of the chosen bid, wherein the selected bids include the chosen bid;

(d) form in the memory from the selected bids at least part of a search tree that includes inclusion branches and exclusion branches and which defines for each selected bid at least one node on one level of the search tree that is connected to at least one other node on another level of the search tree by either an inclusion branch or an exclusion branch;

(e) search a plurality of unique paths of the search tree formed in the memory to determine for each path a candidate allocation of the selected bids, wherein each candidate allocation includes a combination of the selected bids that lie along the corresponding search path and a price that is the sum of the bid prices of the combination of the selected bids; and (f) when a price of a candidate allocation is better than a current price of a best allocation stored in a memory location, update the memory location storing the best allocation and its price with the candidate allocation and its price.

16. The computer readable medium of claim 15, wherein, in step (e), the instructions cause the processor to perform the steps of:
determine an upper bound price of a first group of bids of a subtree of the search tree;
determine a difference between (1) a sum of the price(s) of the bid(s) that lie on a search path connected to the subtree and (2) the current price of the best allocation;
if the upper bound price is less than or equal to said difference, exclude each branch of the subtree from the search path; and
if the upper bound price is greater than said difference, include at least one branch of the subtree on the search path.

17. The computer readable medium of claim 16, wherein, when determining the upper bound, the instructions cause the processor to perform the steps of:
(1) form a first linear program matrix for the first group of bids wherein each column of the first matrix represents one of bids of the first group of bids, the intersection of each row and each column includes a variable, and a quantity of the corresponding item in the corresponding bid and the sum of the quantities in each row equals the total quantity of the corresponding item available in a forward auction, the total quantity of the corresponding item required in a reverse auction or zero (0) in an exchange;
(2) define an objective for the first matrix;
(3) relax each requirement that a solution of the first matrix cause at least one variable thereof to have an integer value whereupon the at least one variable can have any numeric value;
(4) solve the first matrix to achieve the objective thereby determining values for the variables; and
(5) determine the upper bound price of the first group of bids as a function of the thus determined values of the variables of the first matrix.

18. The computer readable medium of claim 17, wherein the objective is either maximize the cost of items sold in a forward auction, minimize the cost of items purchased in reverse auction or maximize a difference between the cost of items sold and the cost of items purchased in an exchange.

19. The computer readable medium of claim 17, wherein the instructions cause the processor to perform the further step of:
terminating the search if the at least one variable that would have an integer value had each requirement in step (3) not been relaxed has an integer value in response to the solution in step (4).

20. The computer readable medium of claim 17, wherein the instructions cause the processor to perform the further steps of:
identify a second group of bids that is a subset of the first group of bids;
form a second linear program matrix for the second group of bids wherein each column of the second matrix represents one of the bids of the second group of bids, the intersection of each row and each column includes a variable and a quantity of the corresponding item in the corresponding bid and the sum of the quantities in each row equals the total quantity of the corresponding item available in a forward auction, the total quantity of the corresponding item required in a reverse auction or zero (0) in an exchange;
relax each requirement that a solution of the second matrix cause at least one variable thereof to have an integer value whereupon the at least one variable can have any numeric value;
assigning to the value of the variable at the intersection of each row and column of the second matrix the value determined for the variable at the intersection of the corresponding row and column of the first matrix; and
determine the upper bound price of the second group of bids as a function of the substituted values of the variables in the second matrix.

21. The computer readable medium of claim 17, wherein the instructions cause the processor to perform the further step of:
terminate the solution of the first matrix in step (4) when the upper bound price is greater than said difference.

22. The computer readable medium of claim 15, wherein, when a first selected bid has an item in common with a second selected bid, only the first selected bid or the second selected bid is included in a candidate allocation.

23. The computer readable medium of claim 19, wherein, when no selected bid has an item in common with another selected bid, all of the selected bids can be included in a candidate allocation.

24. The computer readable medium of claim 17, wherein, in step (b), the instructions cause the processor to perform the further step of:
choosing the one received bid based on at least one of the following heuristics:
the bid having the highest normalized bid price;
the bid having a bid price with the highest surplus above the worth of the one or more items thereof;
the bid having the highest number of at least one item in common with another bid;
the bid having the largest number of items,
the bid whose variable has the value closest to 1; and
the bid whose variable has the value closest to 0.5.

25. The computer readable medium of claim 24, wherein the at least one heuristic to be applied depends on at least one characteristic of the linear program matrix.

26. The computer readable medium of claim 25, wherein said at least one characteristic includes at least one of the following:
the number of columns in the first matrix;
the number of rows in the first matrix;
the number of nonzero coefficients in the first matrix; and
the number of nonzero coefficients in the first matrix divided by the product of the number of columns and the number of rows in the first matrix.

27. The computer readable medium of claim 15, wherein the instructions cause the processor to perform the further steps of:
separate the selected bids into at least one group of disjoint bids; and
determine an upper bound for each group of bids.

28. The computer readable medium of claim 27, wherein the instructions cause the processor to perform the further steps of:
(g) determine for one group of bids a value MIN that represent a minimum price the group of bids must exceed to find a candidate allocation that has a price better than the current price of the best allocation;

(h) if the upper bound for the group of bids is less than MIN for the group of bids terminate searching the group of bids, otherwise define from the group of bids a first subgroup of bids;

(i) choose one of the bids of the first subgroup of bids;

(j) select bids from the first subgroup of bids as a function of the bid chosen in step (i), wherein the bids selected from the first subgroup of bids include the bid chosen in step (i);

(k) form from the bids selected in step (j) at least part of another search tree that defines for each bid selected in step (j) at least one node on one level of the search tree that is connected to at least one other node on another level of the search tree by at least one of an inclusion branch and an exclusion branch;

(l) search a plurality of unique paths of the other search tree to determine for each path a candidate allocation of the selected bids, wherein each candidate allocation includes a combination of the selected bids that lie along the corresponding search path and a price that is the sum of the bid prices of the combination of the selected bids; and (m) when a price of a candidate allocation in step (l) is better than the current price of the best allocation, update the best allocation and its price with the candidate allocation and its price.

* * * * *

UNITED STATES PATENT AND TRADEMARK OFFICE
CERTIFICATE OF CORRECTION

PATENT NO. : 7,640,189 B2 Page 1 of 1
APPLICATION NO. : 10/411879
DATED : December 29, 2009
INVENTOR(S) : Sandholm et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2028 days.

Signed and Sealed this

Ninth Day of November, 2010

David J. Kappos
*Director of the United States Patent and Trademark Office*